Feb. 28, 1967  S. A. BLACK ET AL  3,306,804
TIRE CARCASS BUILDING DRUM
Original Filed Dec. 4, 1962  33 Sheets-Sheet 1
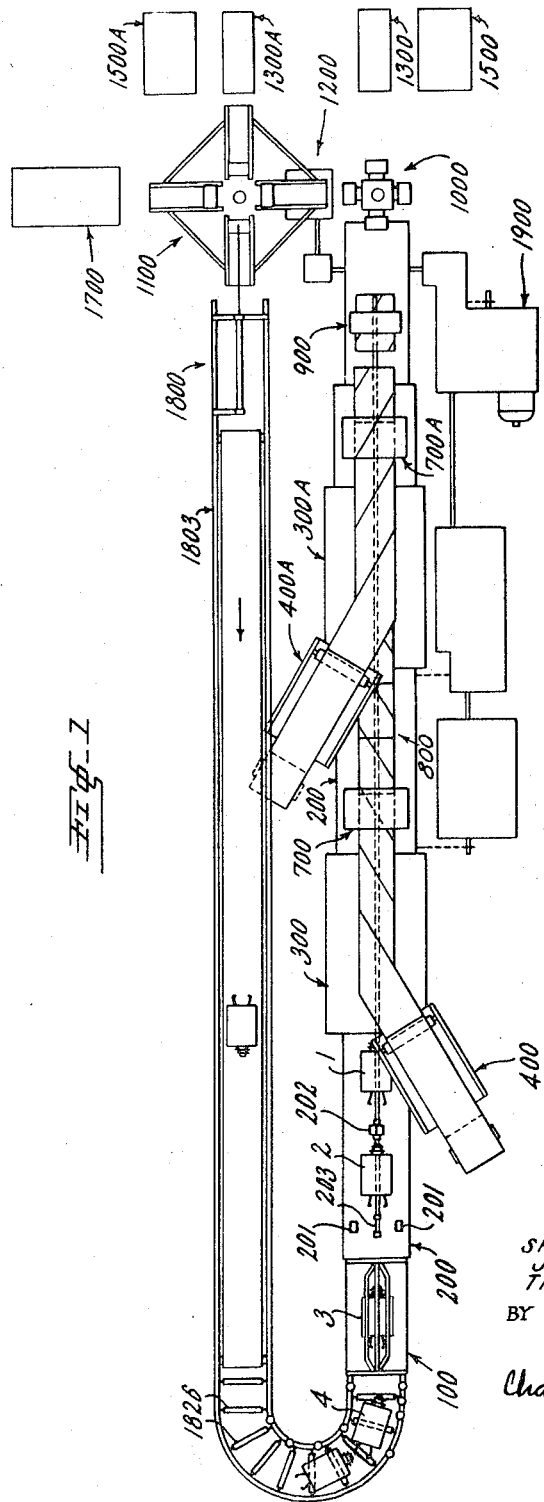
INVENTORS
SHEPPARD A. BLACK
JOHN D. HEIDE
THOMAS J. RHODES
BY
Charles A. Black
ATTORNEY

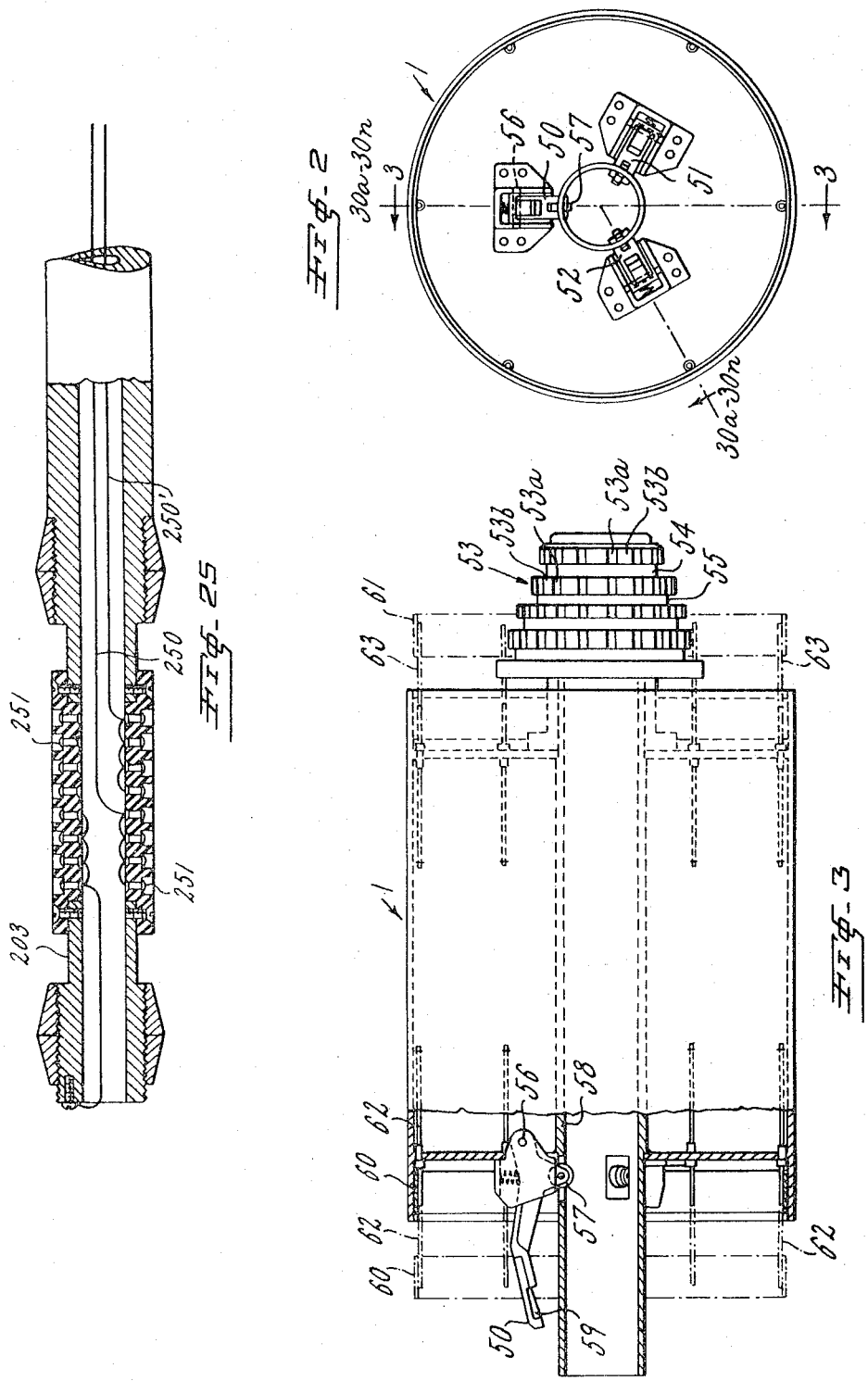

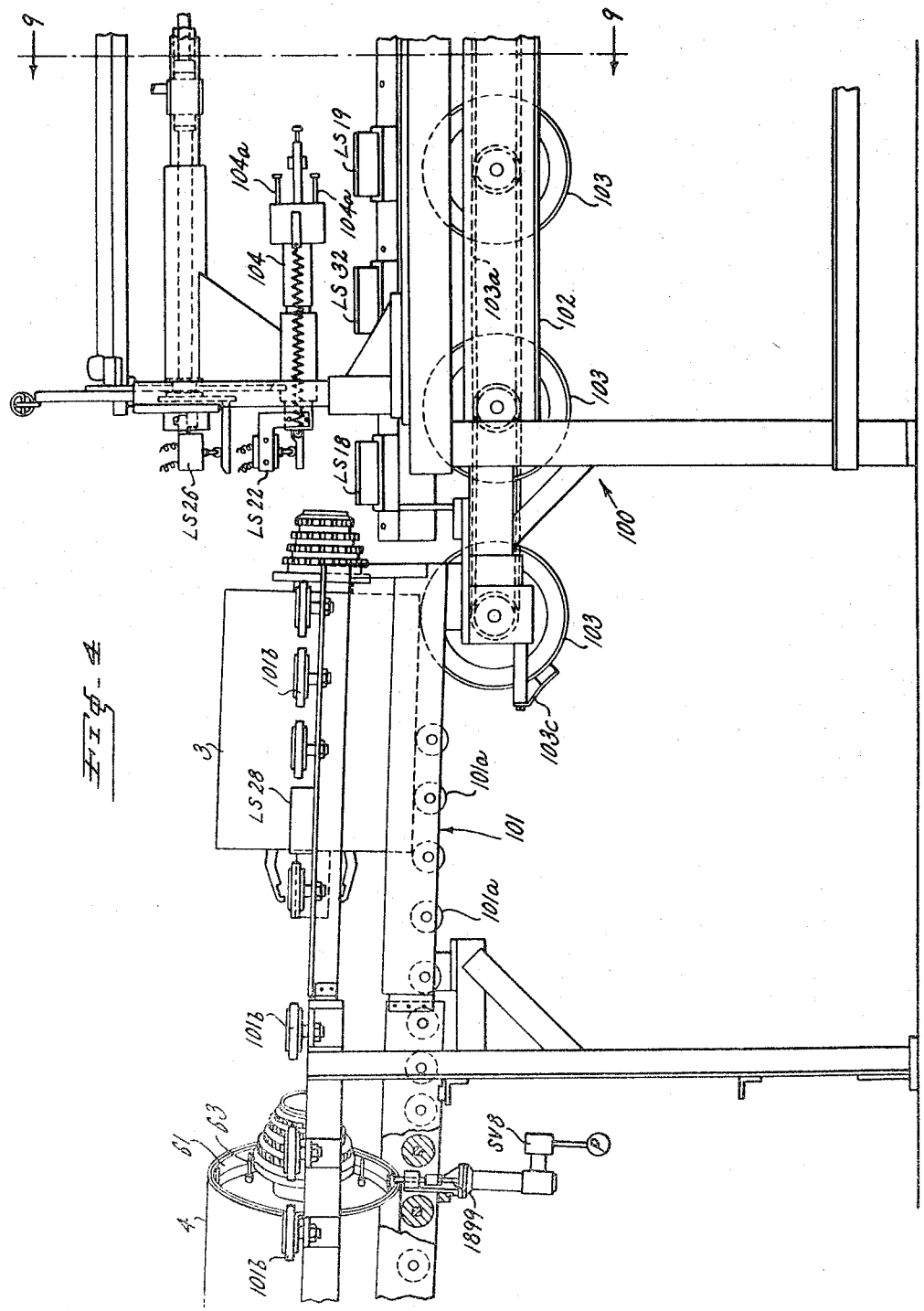

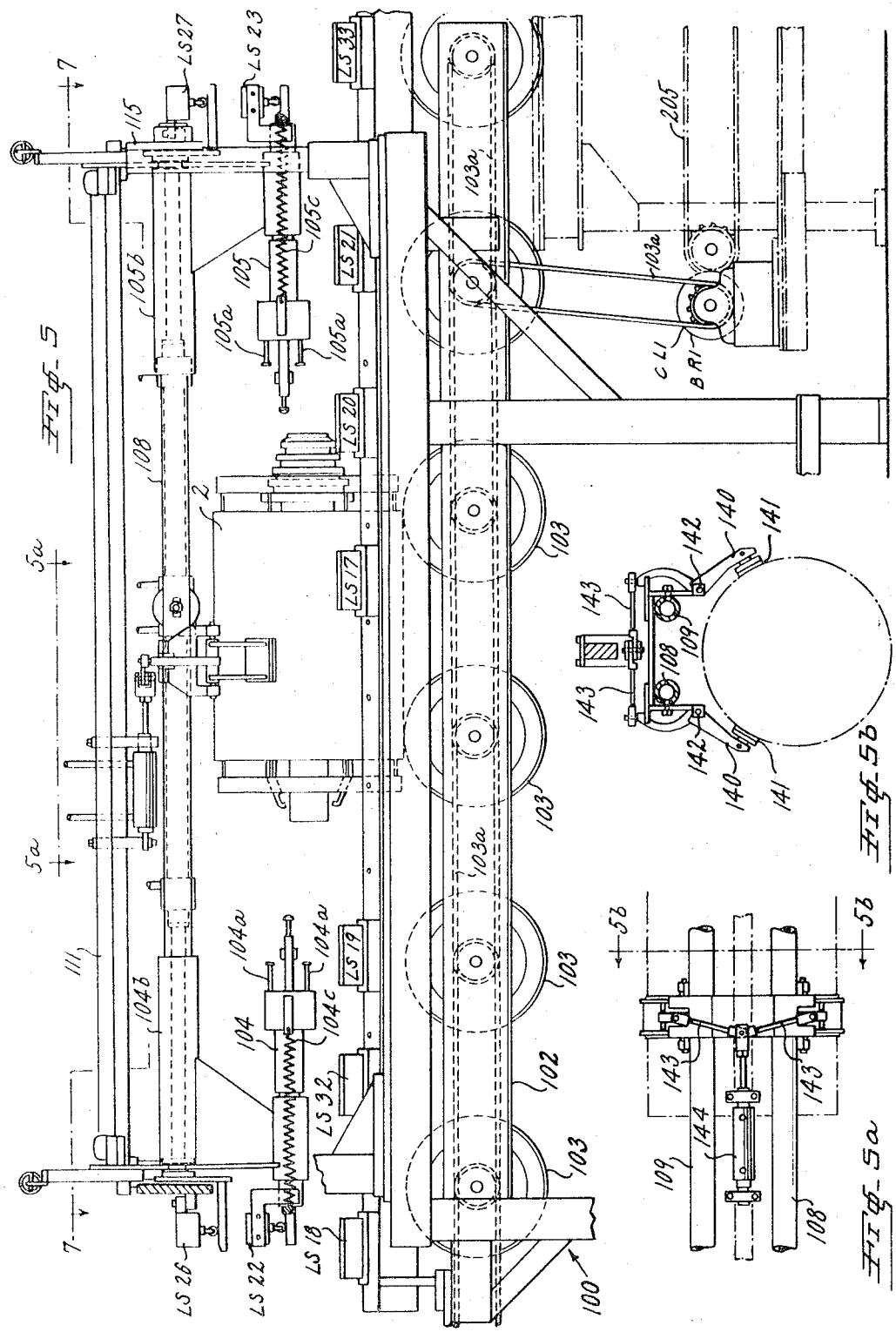

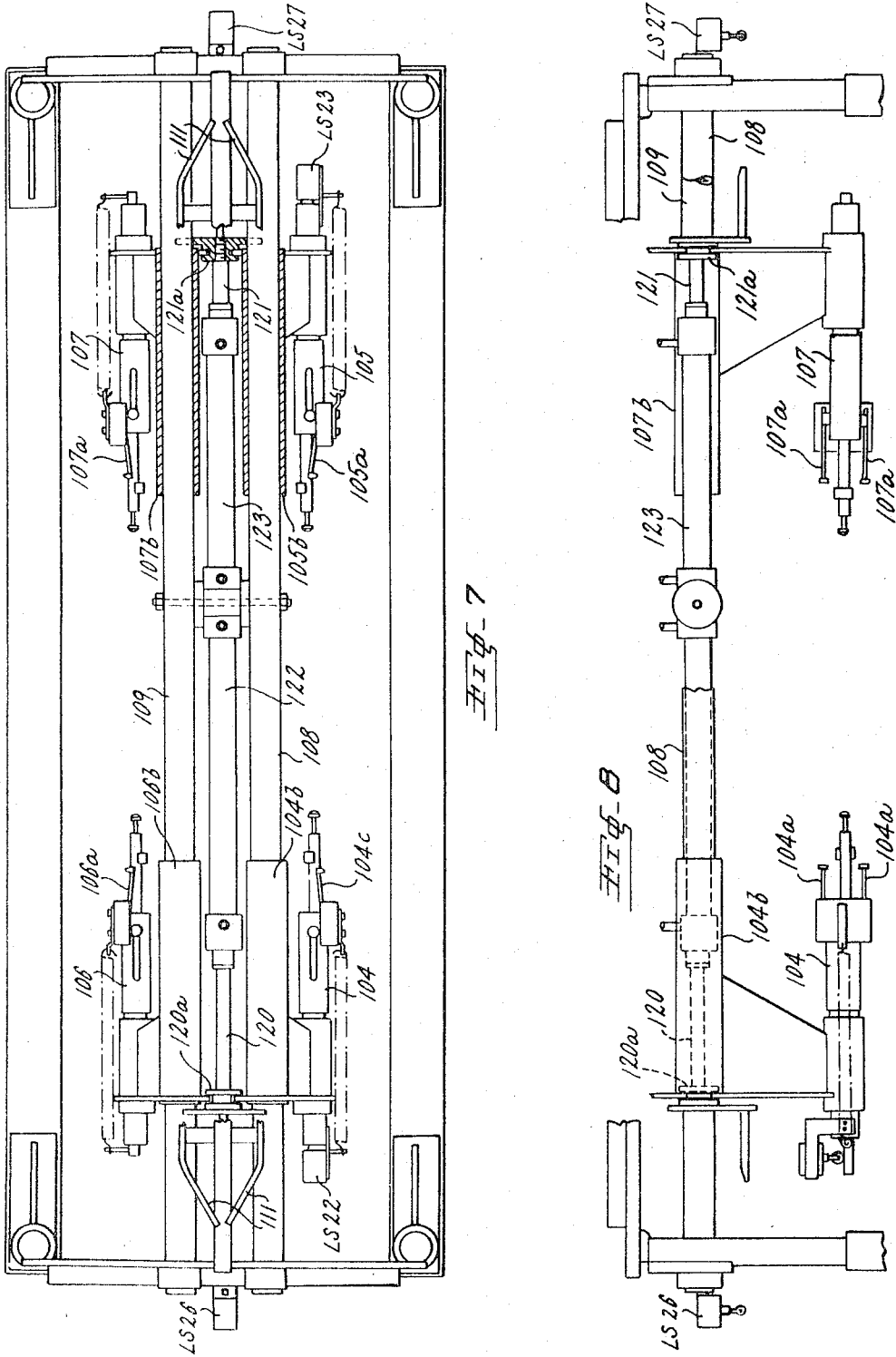

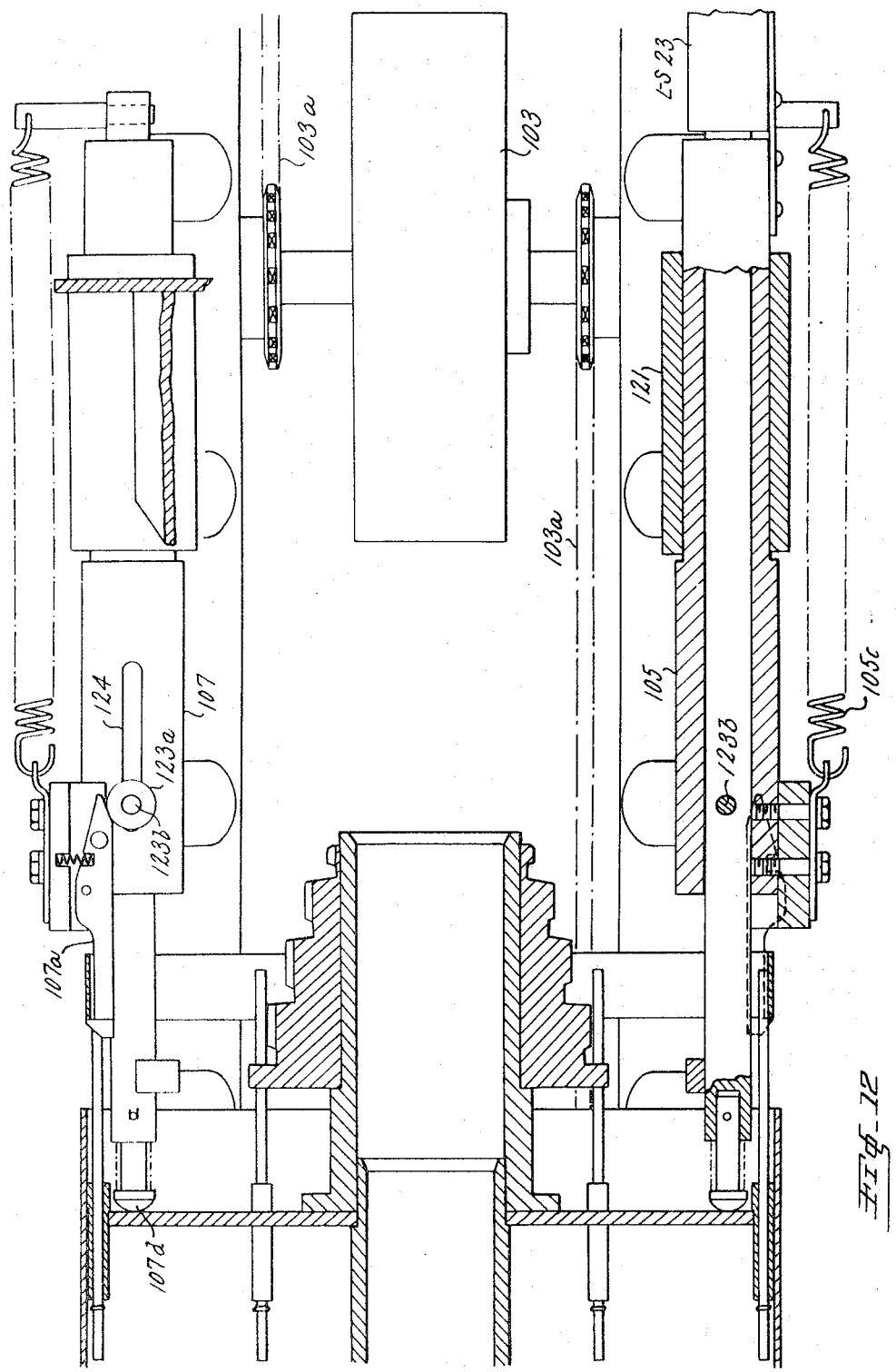

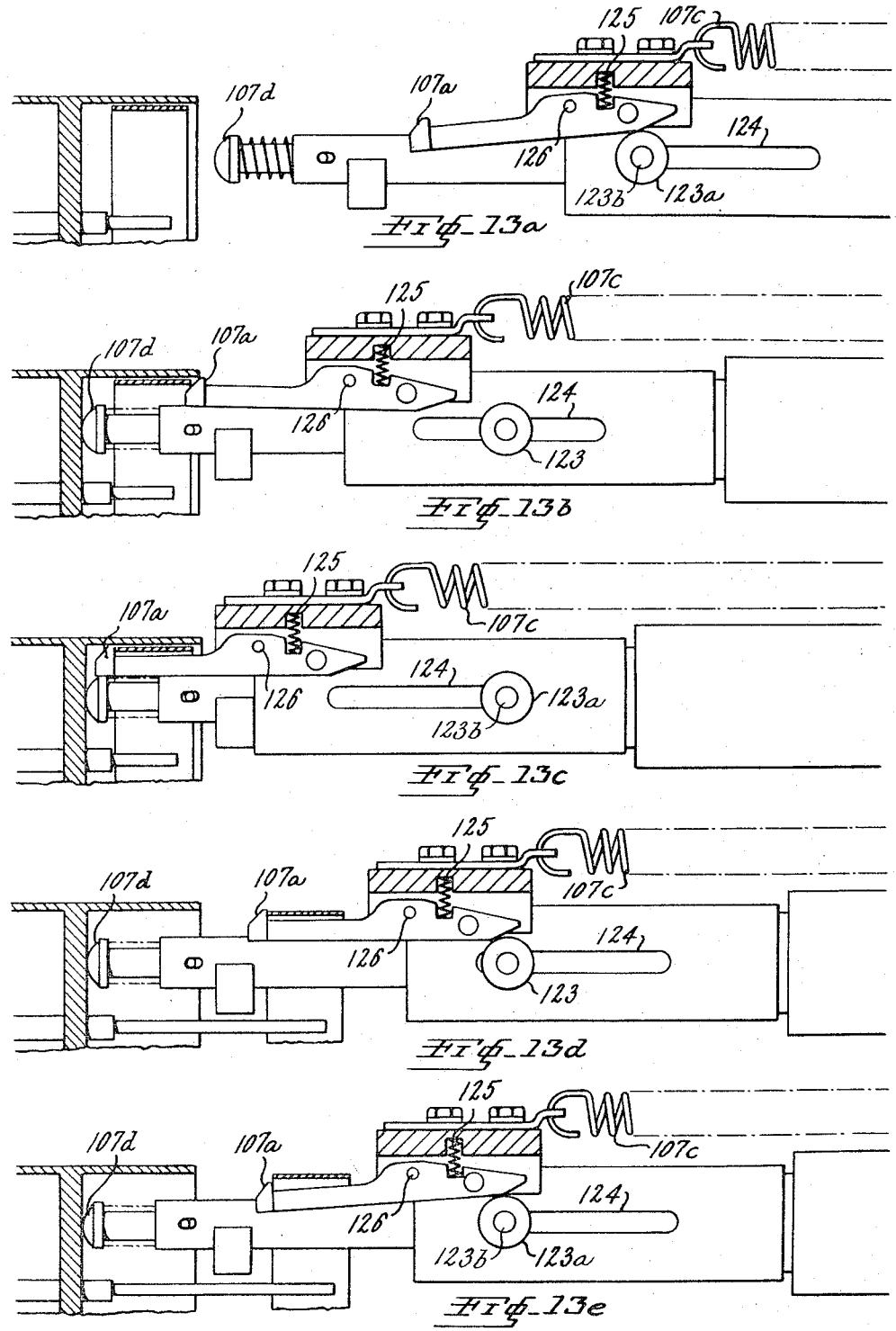

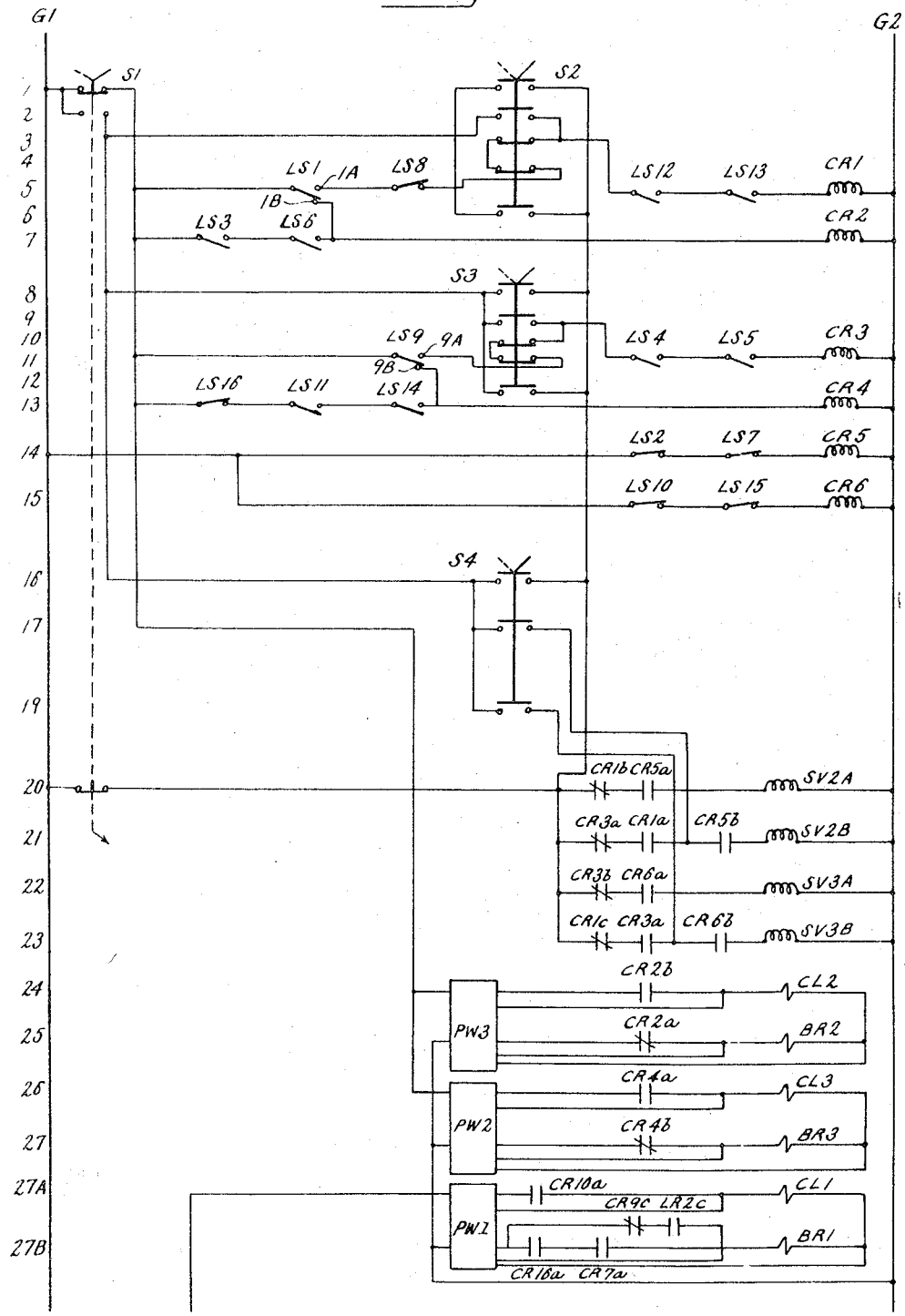

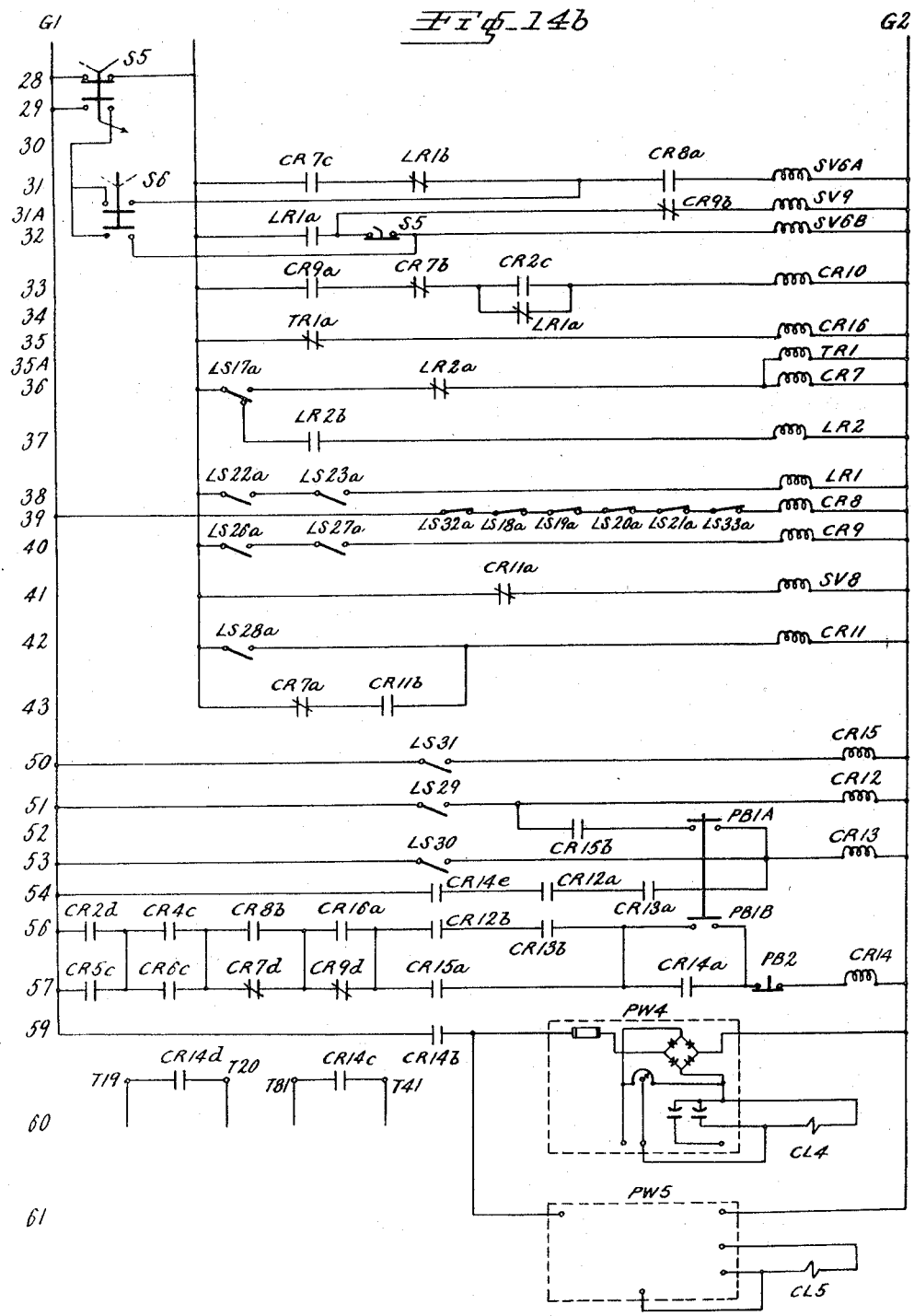

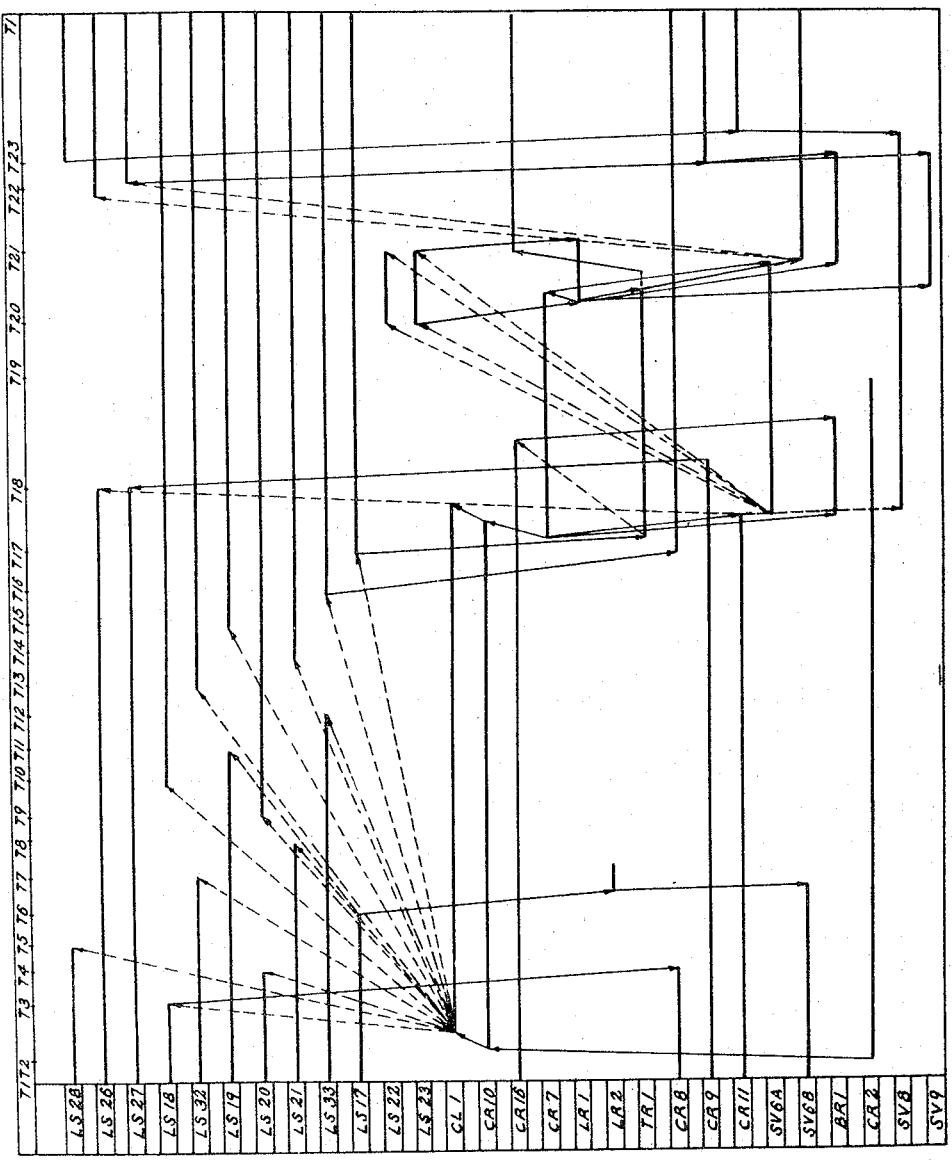

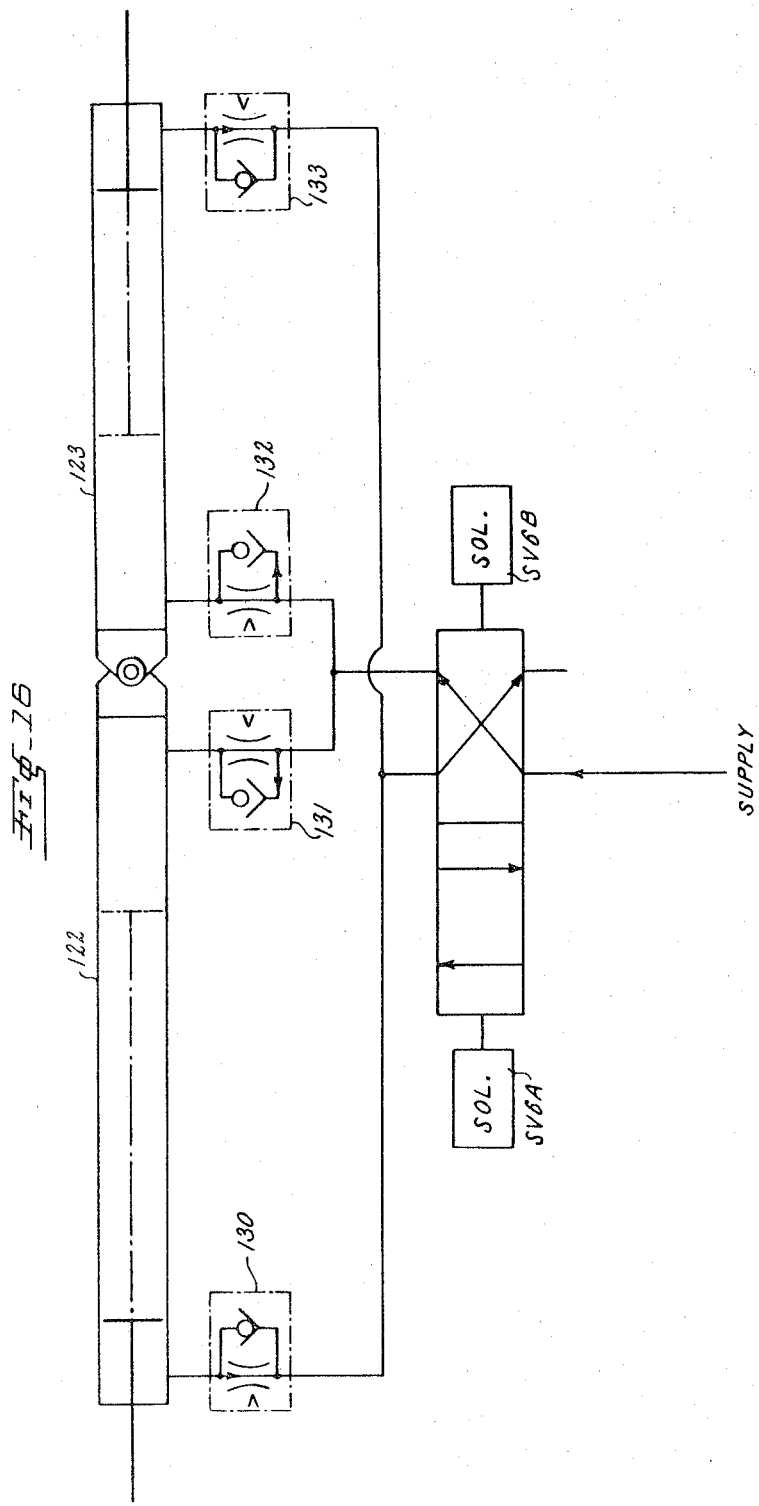

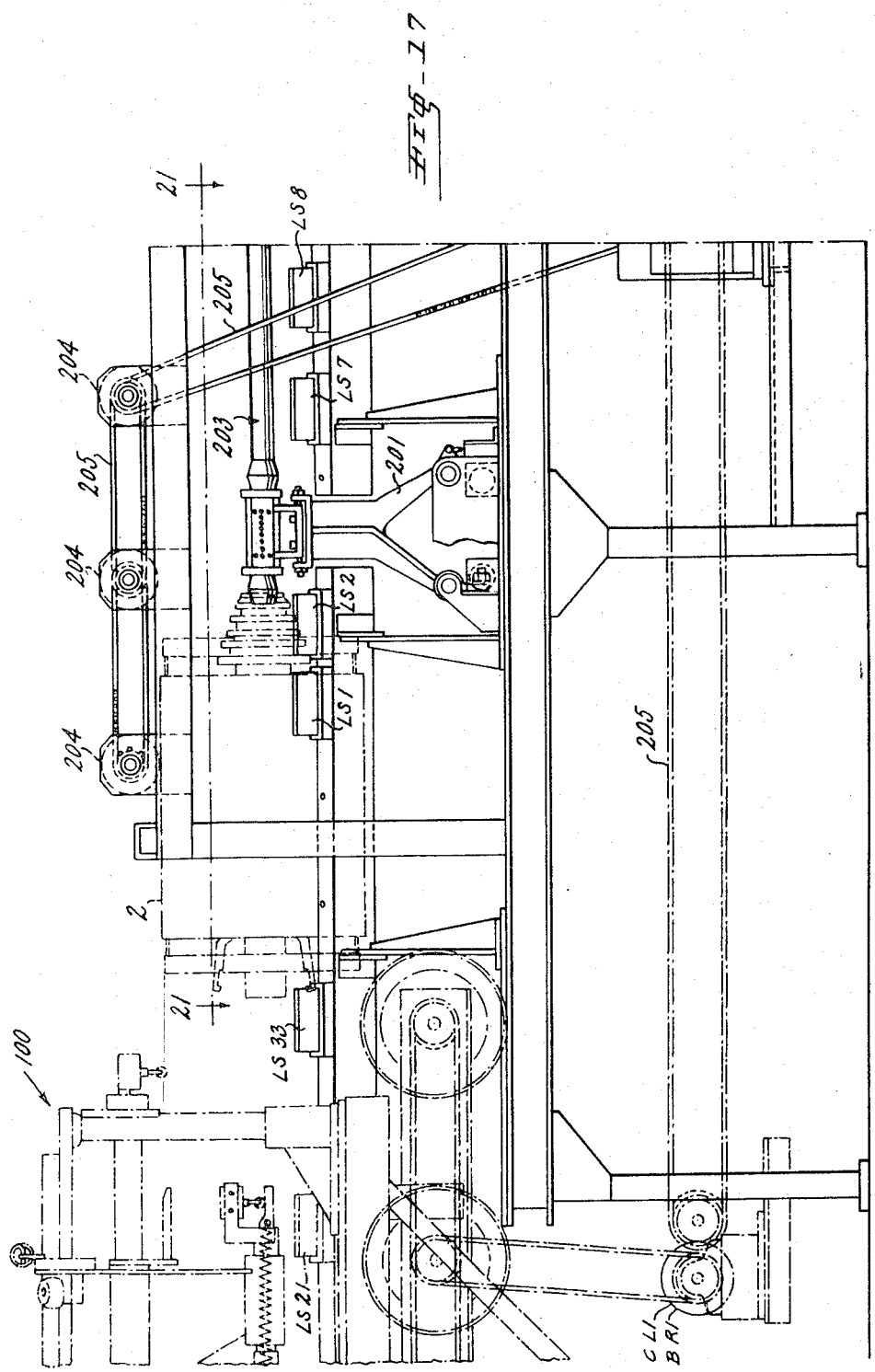

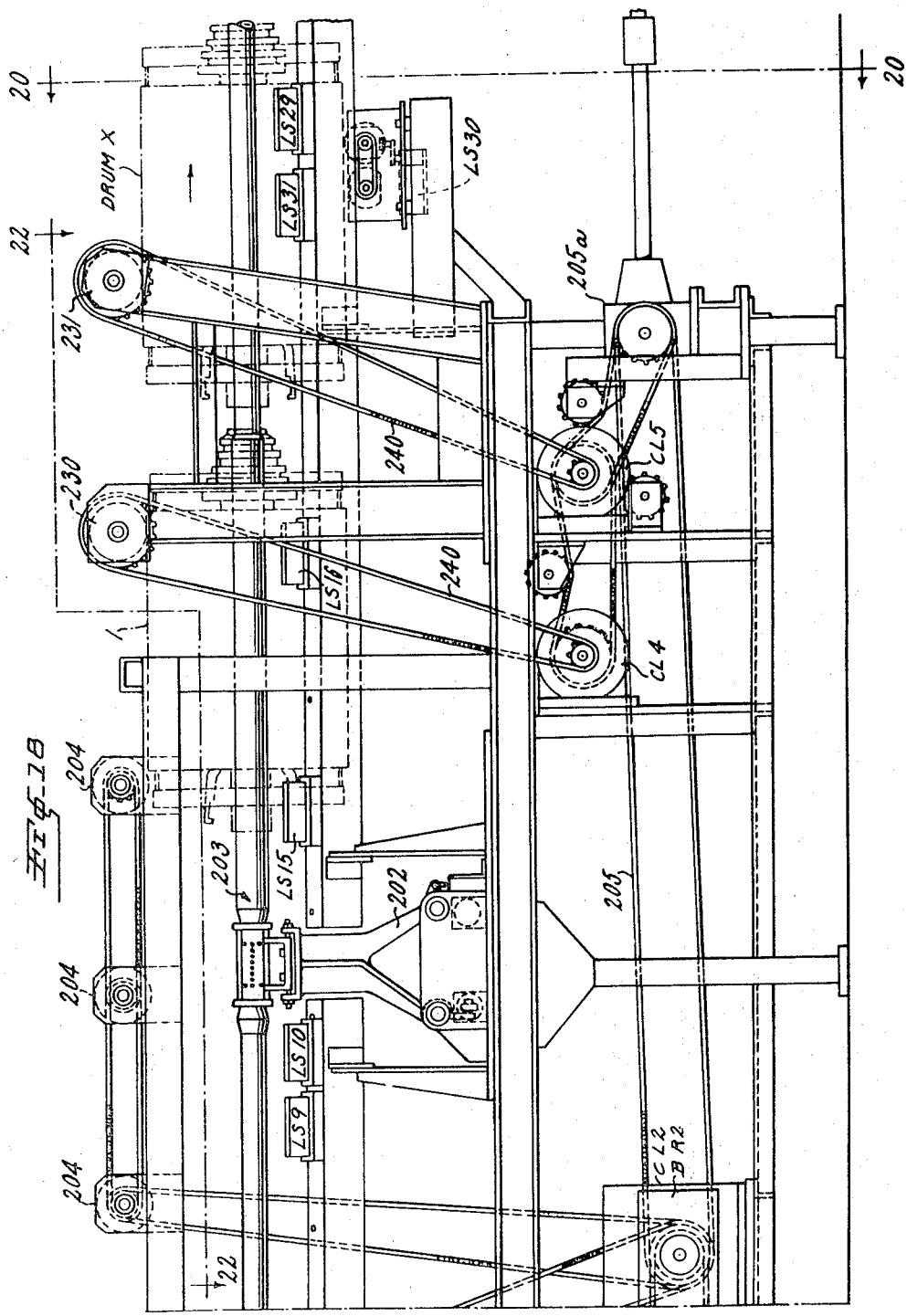

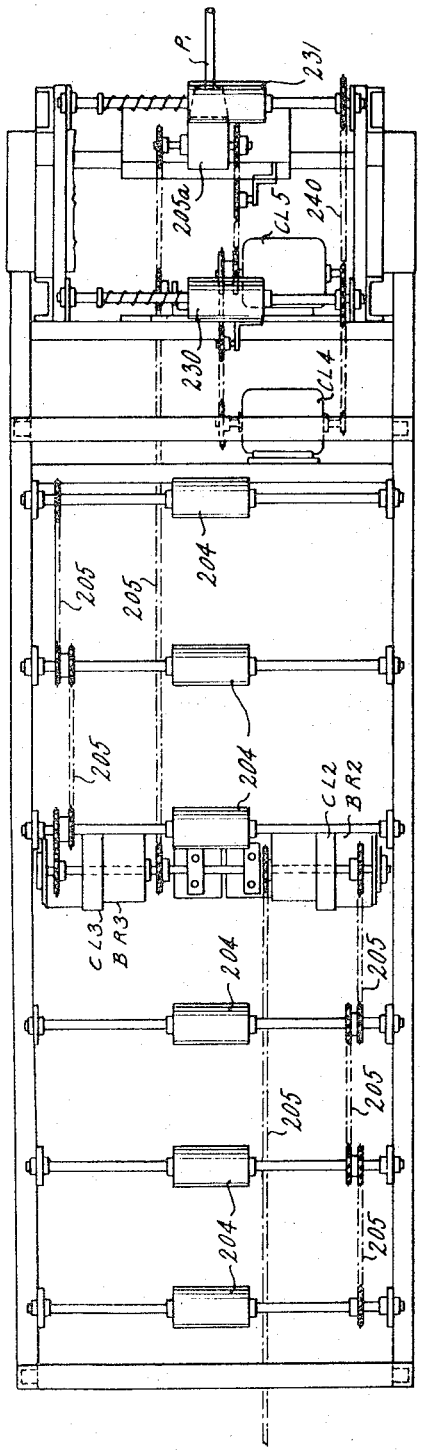

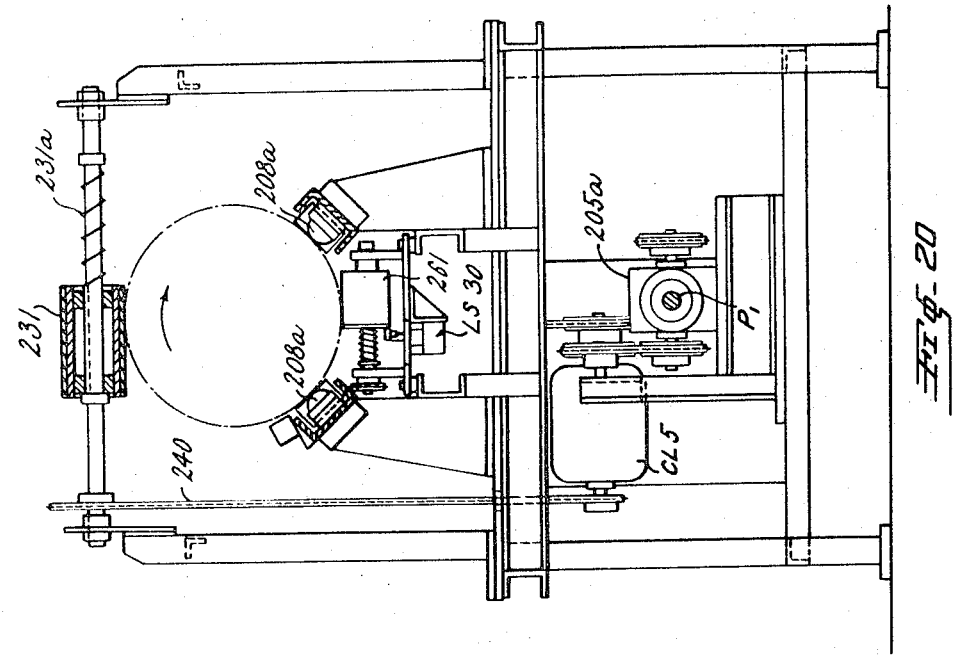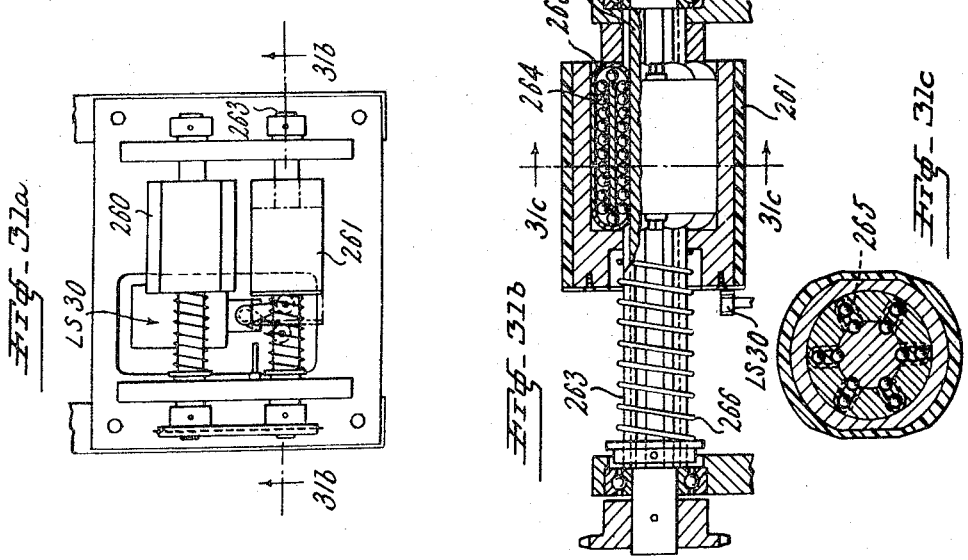

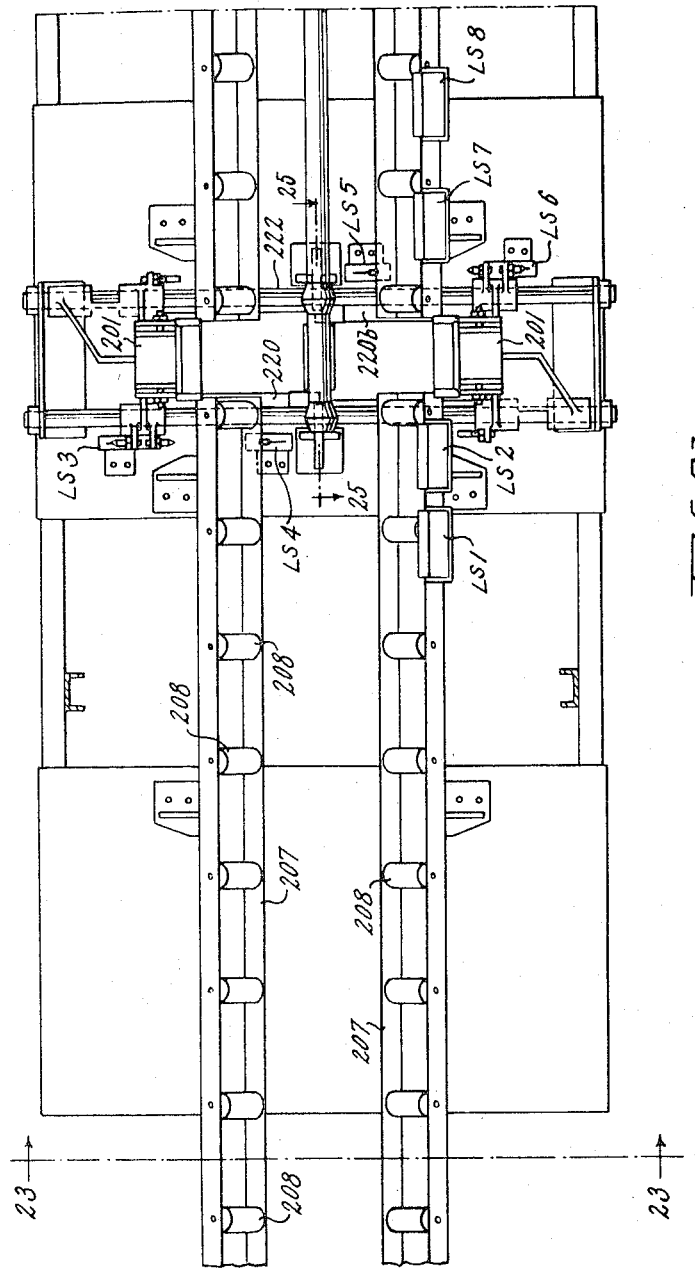

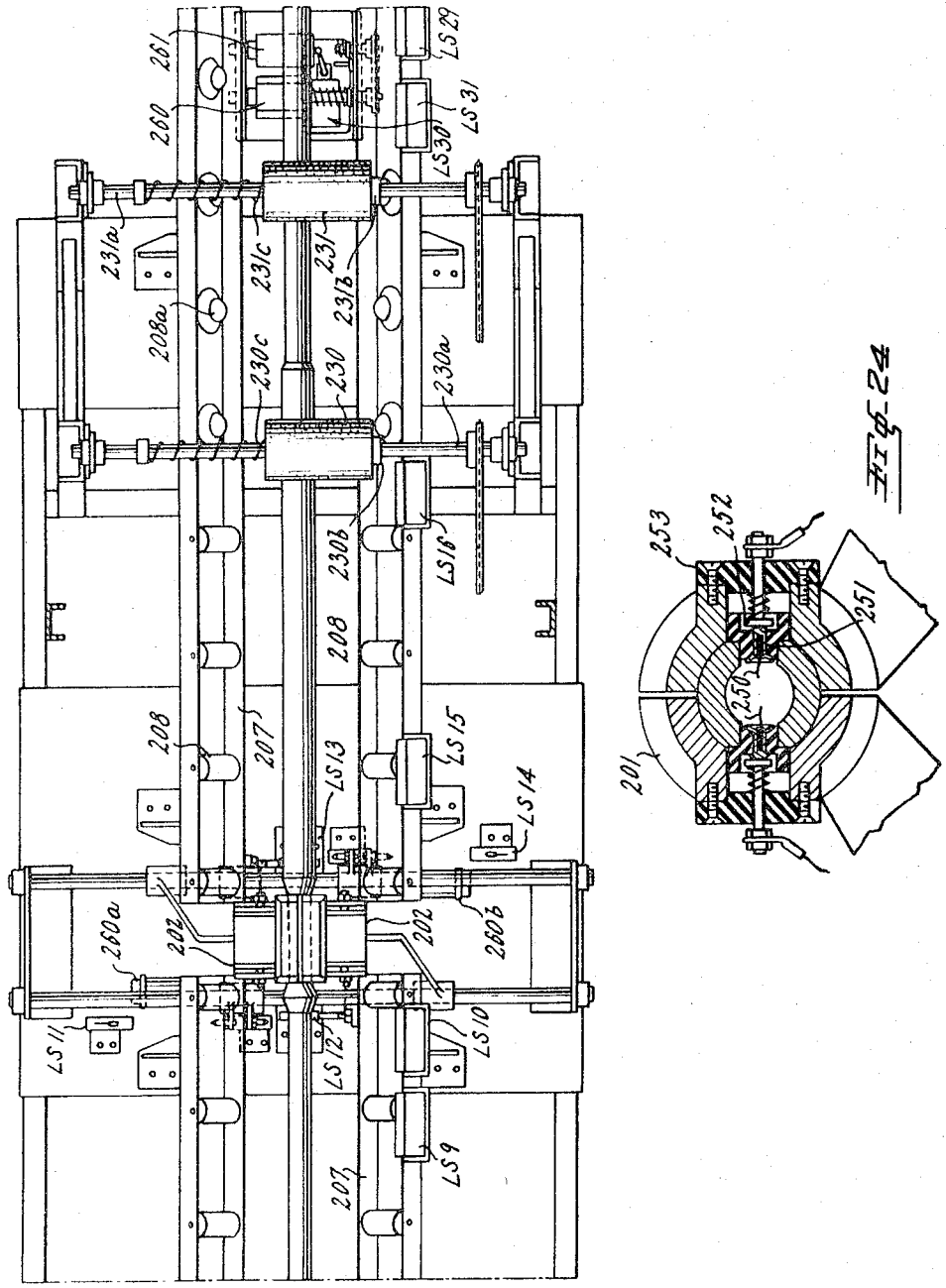

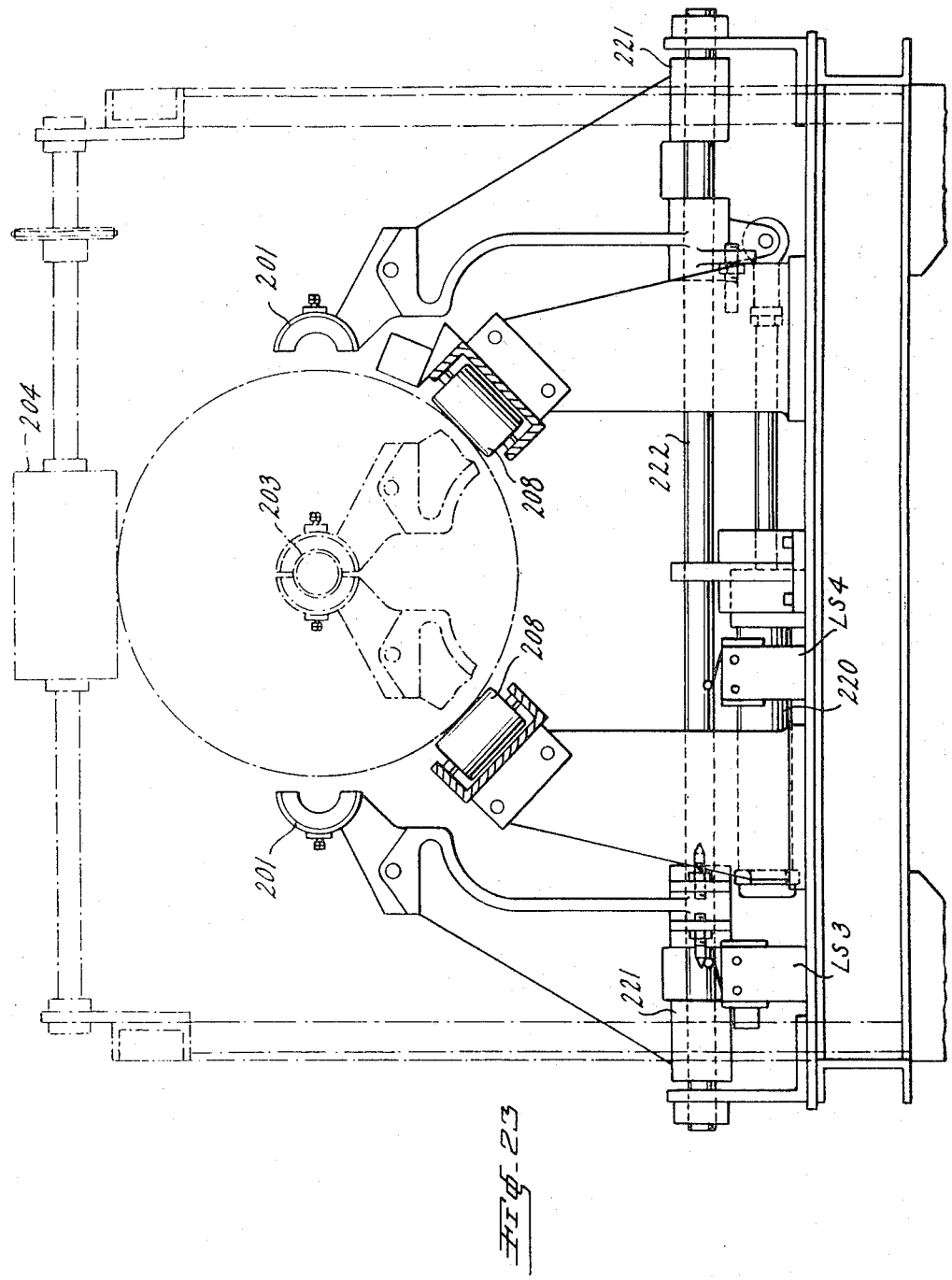

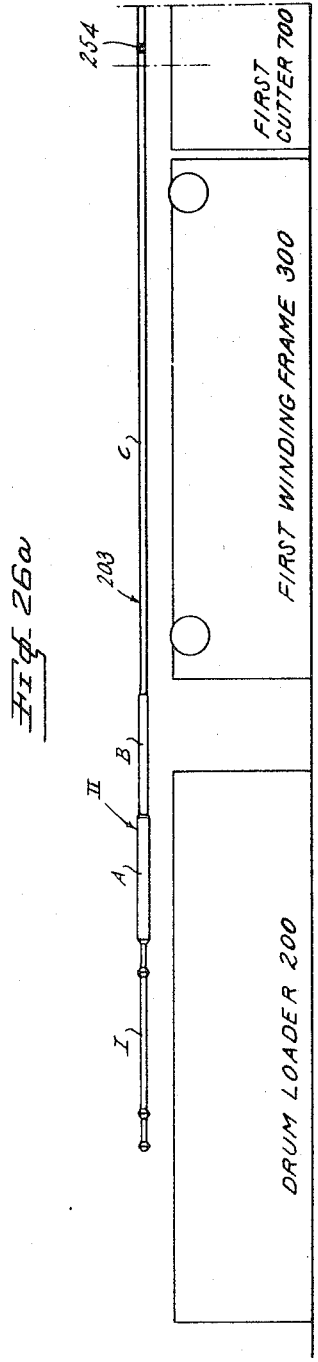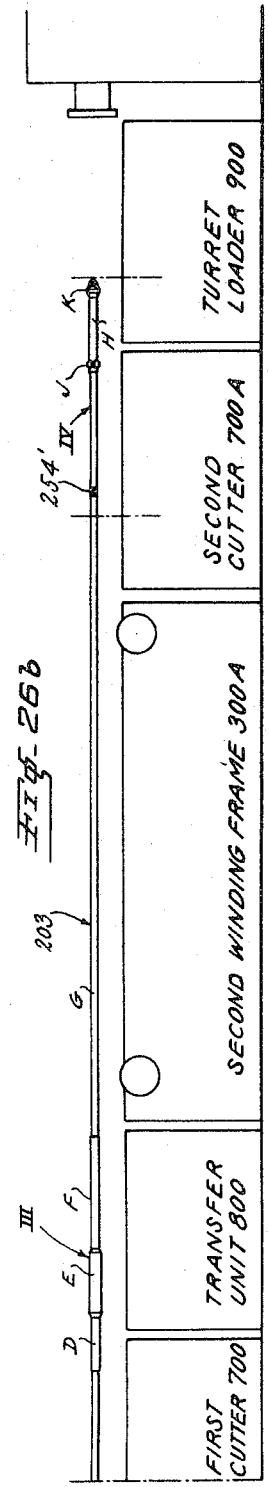

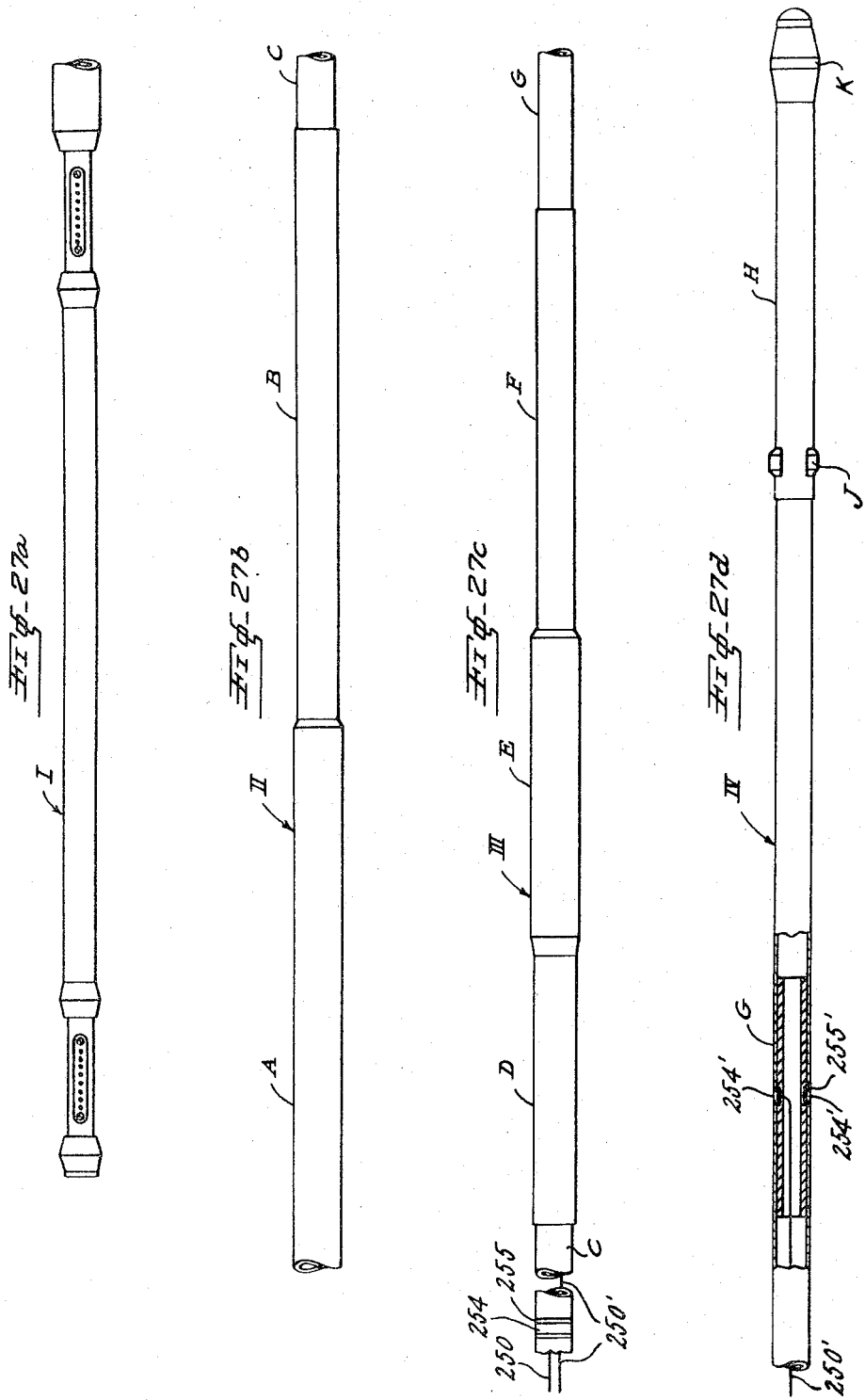

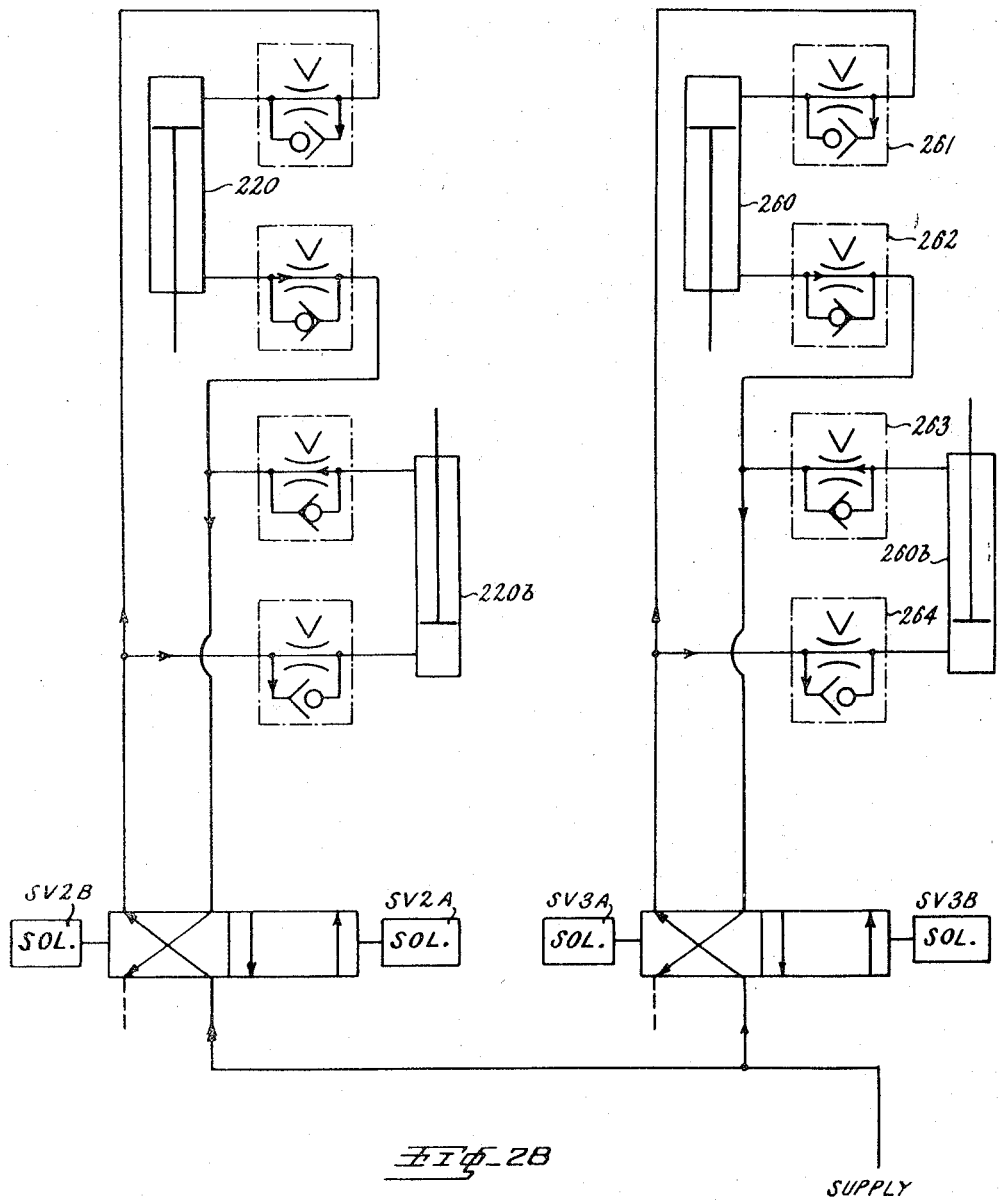

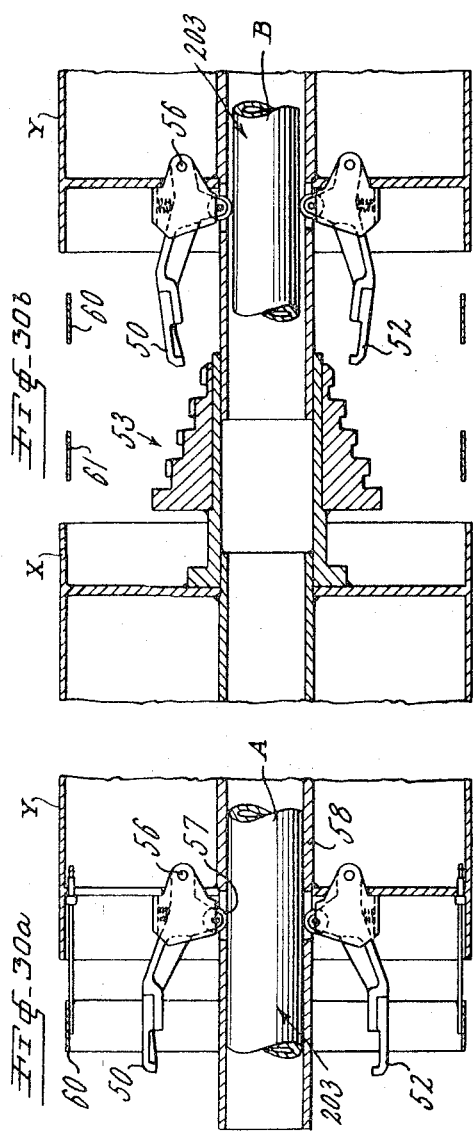
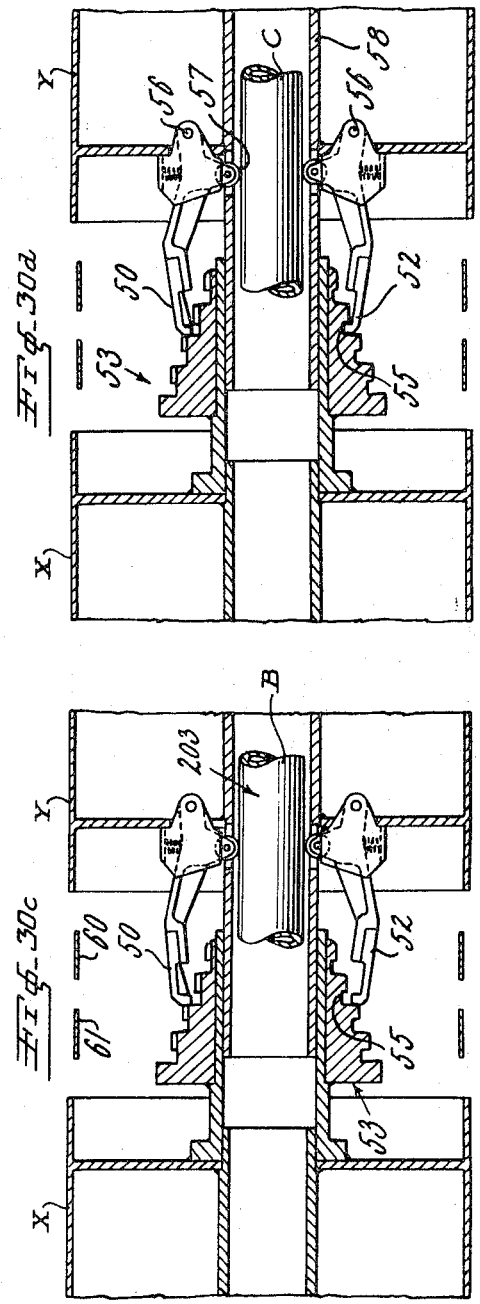

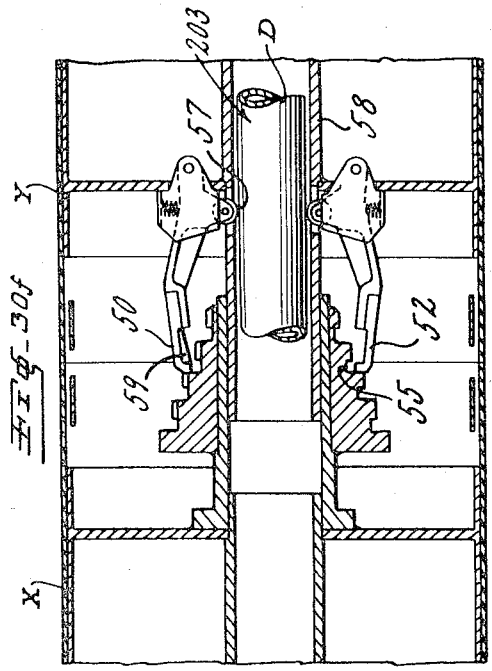
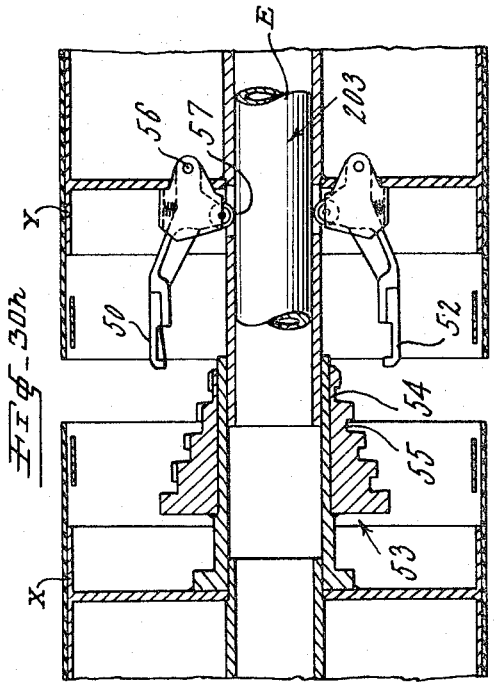
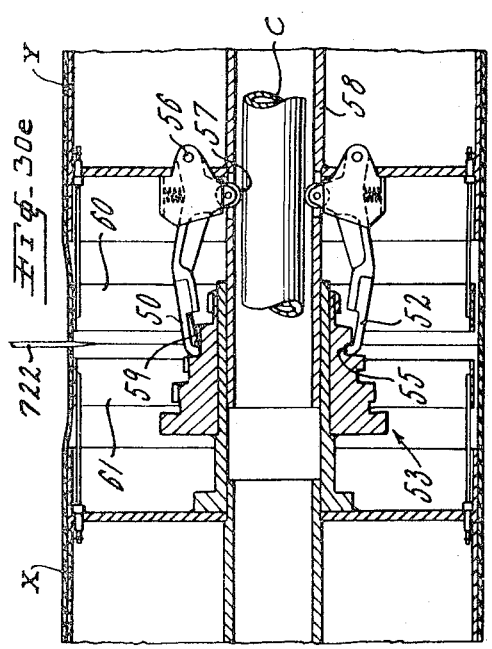
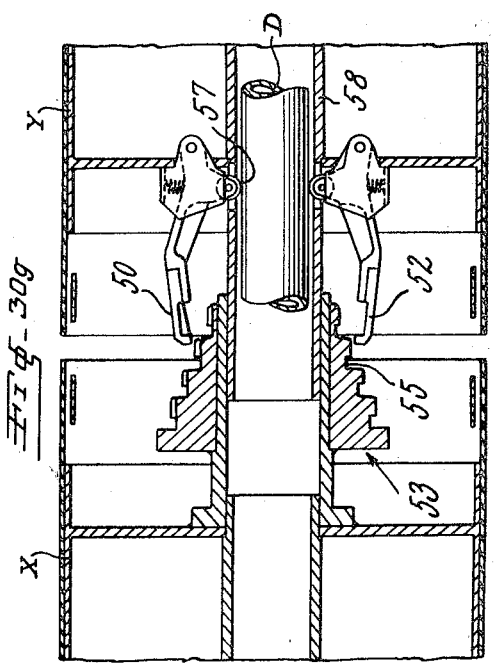

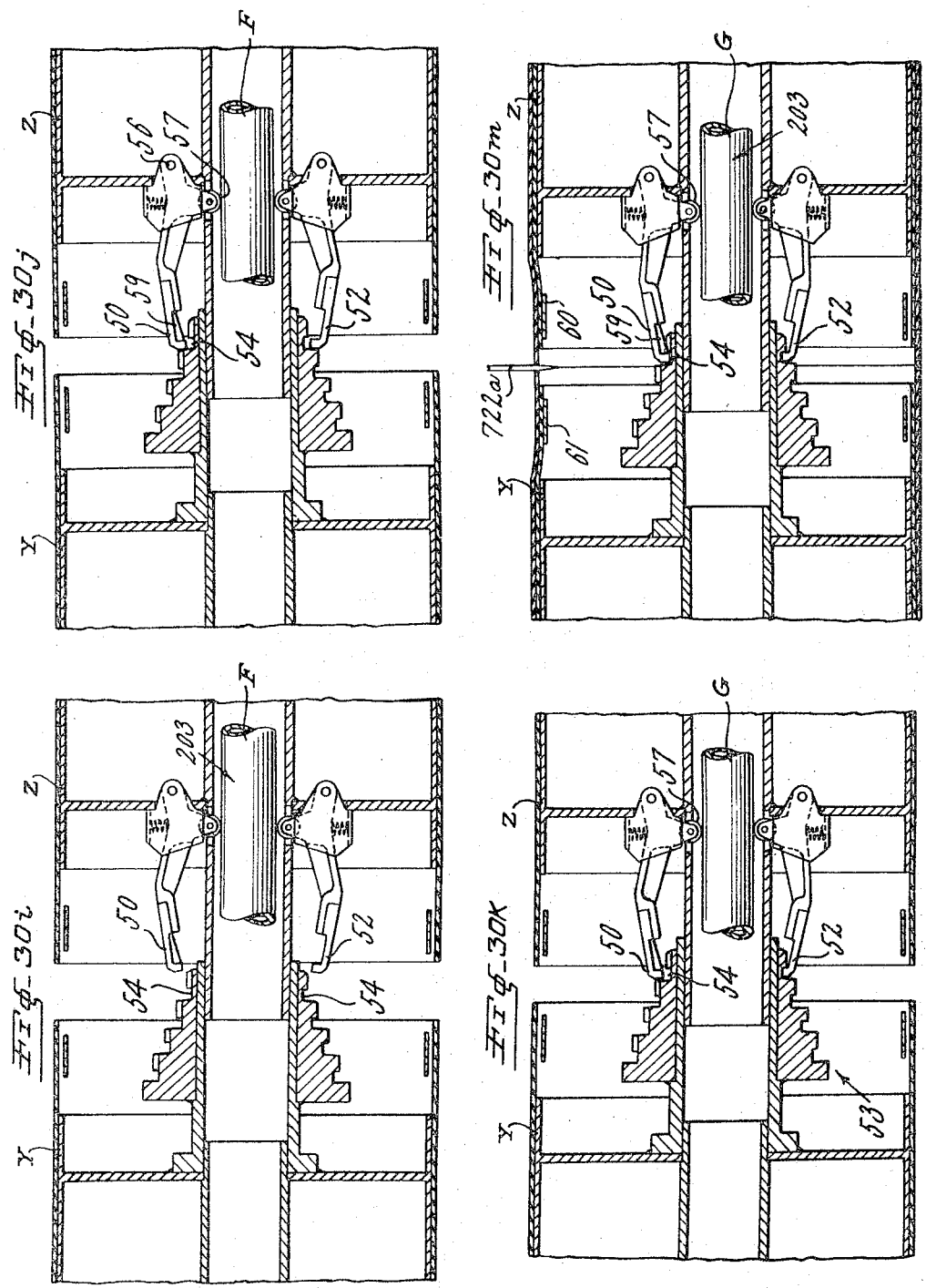

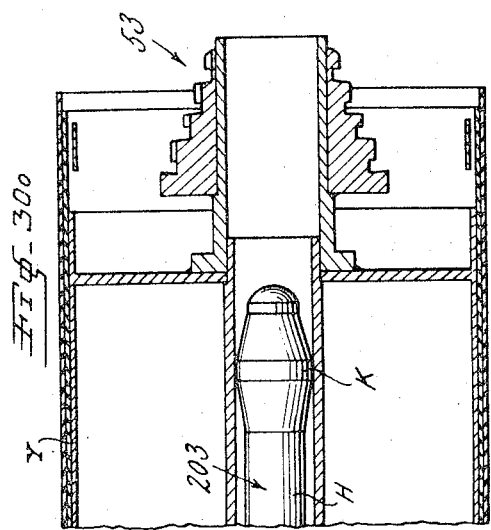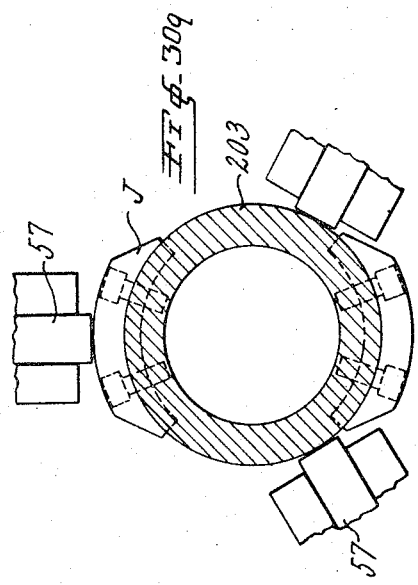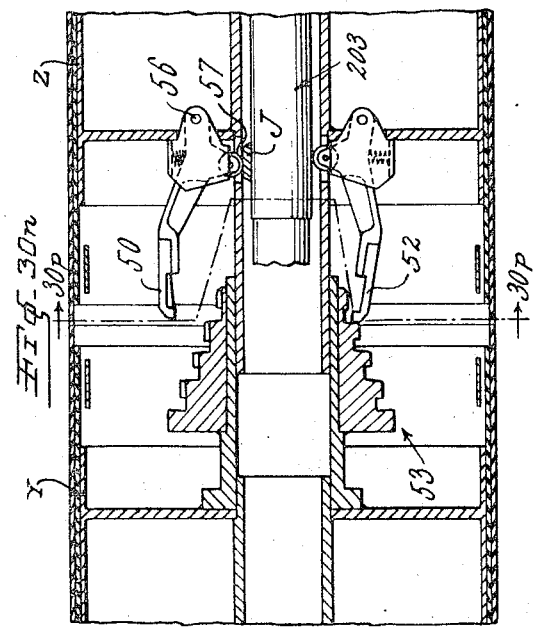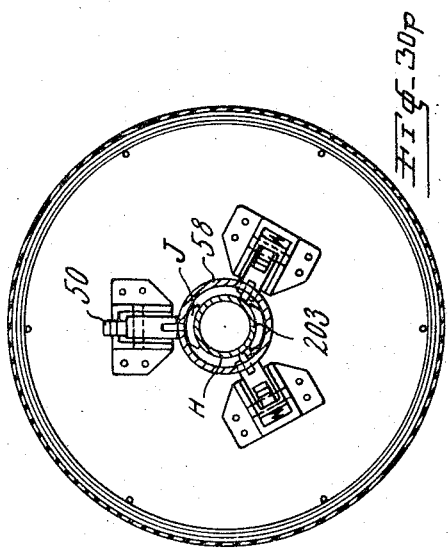

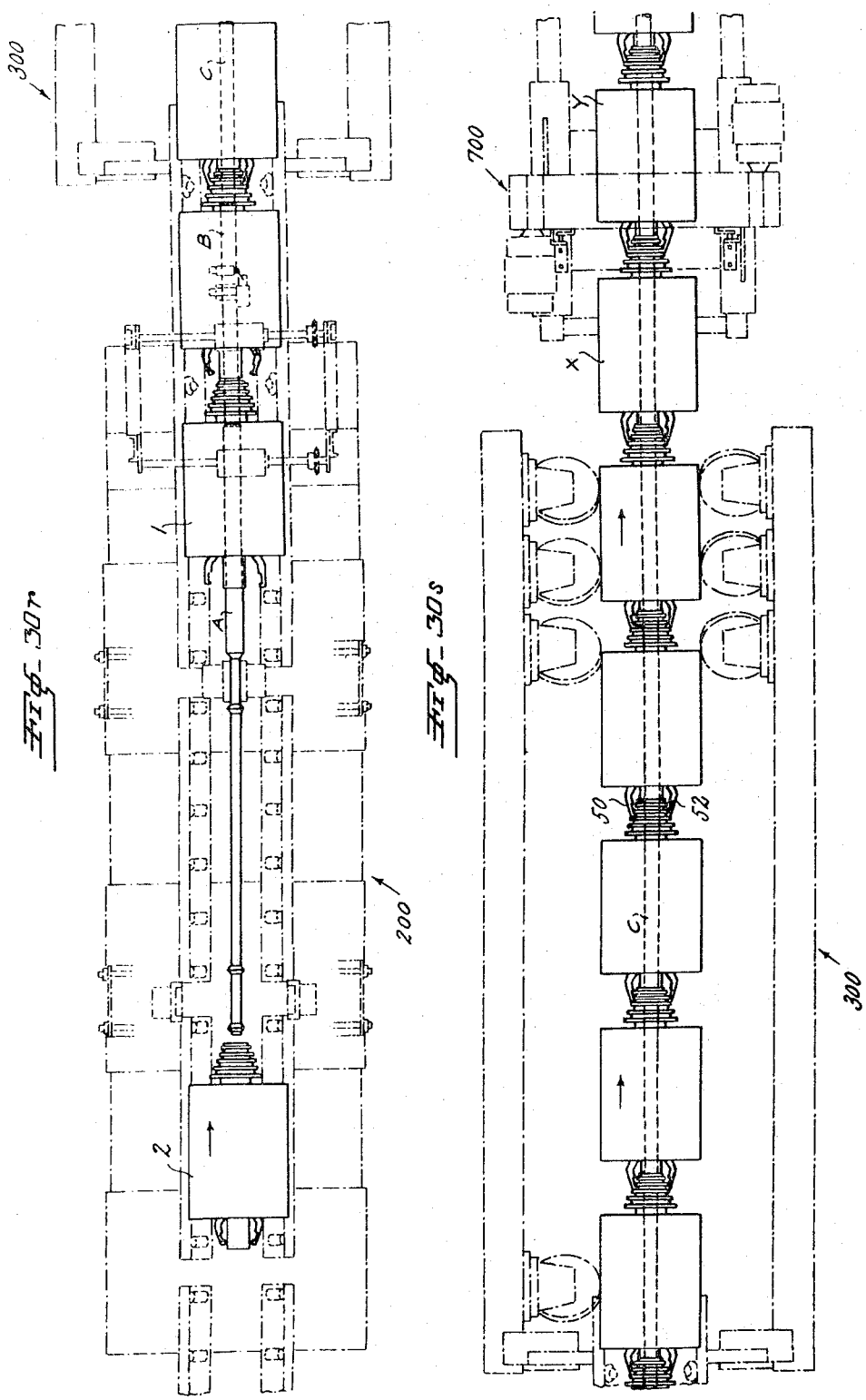

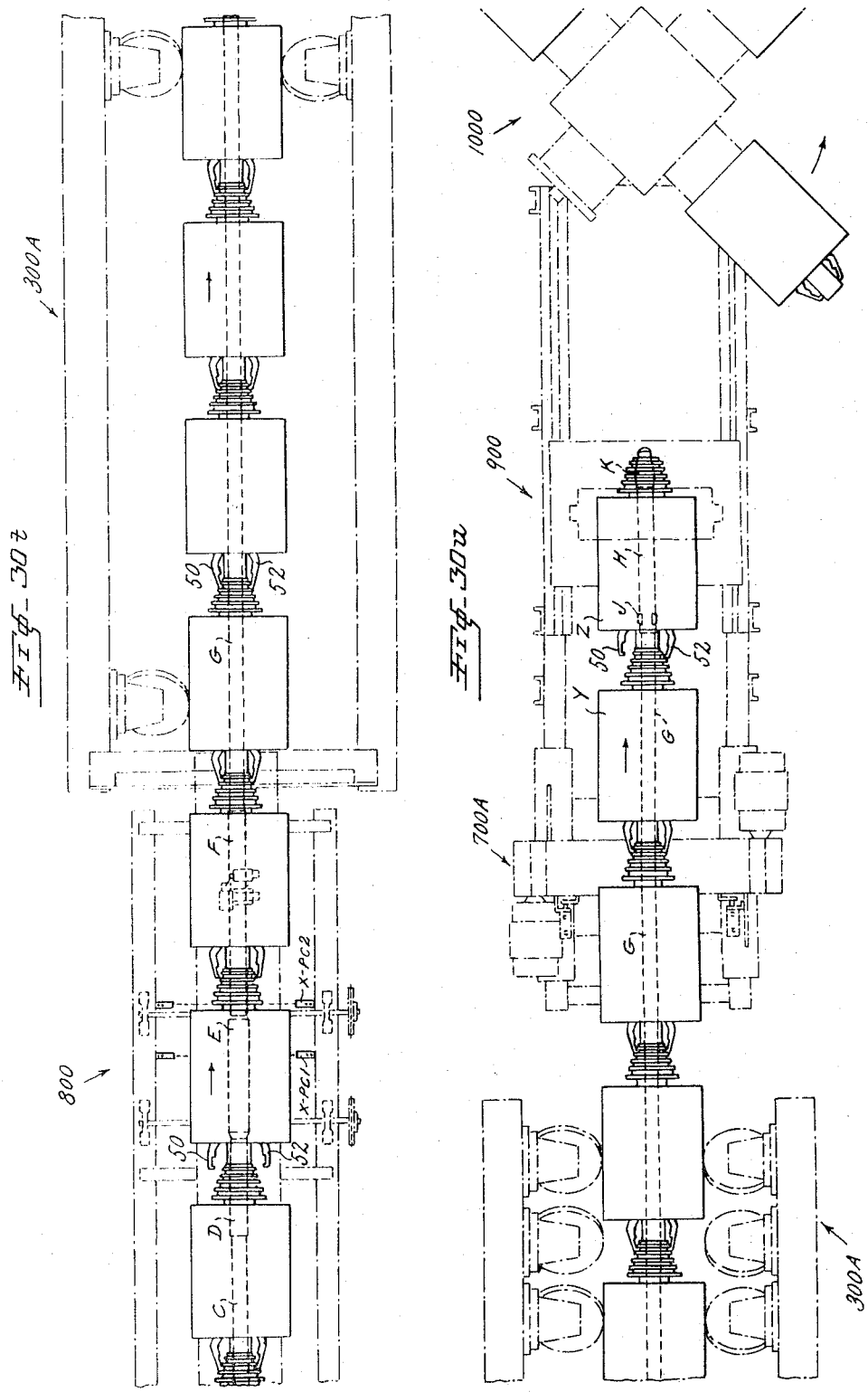

United States Patent Office 3,306,804
Patented Feb. 28, 1967

3,306,804
TIRE CARCASS BUILDING DRUM
Sheppard A. Black, Wayne, John D. Heide, Ramsey, and Thomas J. Rhodes, Kinnelon, N.J., assignors to United States Rubber Company, New York, N.Y., a corporation of New Jersey
Original application Dec. 4, 1962, Ser. No. 242,197. Divided and this application Feb. 1, 1966, Ser. No. 524,124
4 Claims. (Cl. 156—417)

This application is a division of our copending application Serial No. 242,197, filed December 4, 1962 and entitled Method of Making a Tire Carcass.

This invention relates to tire carcass building drums, and, more particularly, to drums for use with apparatus operative as an automatically controlled system for making tire carcasses continuously, as described and claimed in our above-mentioned application.

It is an object of the invention to provide a new and improved tire-carcass building drum for use with apparatus for making tire carcasses automatically.

For a better understanding of the present invention, together with other and further objects thereof, reference is made to the following description, taken in connection with the accompanying drawings, and its scope will be pointed out in the appended claims.

Referring to the drawings:

FIG. 1 is a plan view, partly schematic, of apparatus constructed in accordance with the invention described in detail in our above-mentioned copending application;

FIG. 2 is an end view of a drum constructed in accordance with the invention;

FIG. 3 is a partly sectional view of a drum, taken along line 3—3 of FIG. 2;

FIG. 4 is a side elevational view of a portion of a conveyor and of a portion of band-positioning apparatus utilized in the FIG. 1 apparatus;

FIG. 5 is a side elevational view of the band-positioning apparatus;

FIG. 5a is a fragmentary plan view of the band-positioning apparatus to represent a drum clamp mechanism, taken along line 5a—5a of FIG. 5;

FIG. 5b is a sectional view of the drum clamp mechanism, taken along line 5b—5b of FIG. 5a;

FIG. 7 is a fragmentary plan view, taken along line 7—7 of FIG. 5 with the drum clamp of FIGS. 5a and 5b removed for clarity;

FIG. 8 is a fragmentary side elevational view of apparatus represented in FIG. 7;

FIG. 12 is an enlarged fragmentary view, partly in section, of a portion of the band-positioning apparatus to represent the arms and fingers thereof;

FIGS. 13a–13e are fragmentary views of the arms and fingers of the band-positioning apparatus to represent the operation thereof;

Figure 29:
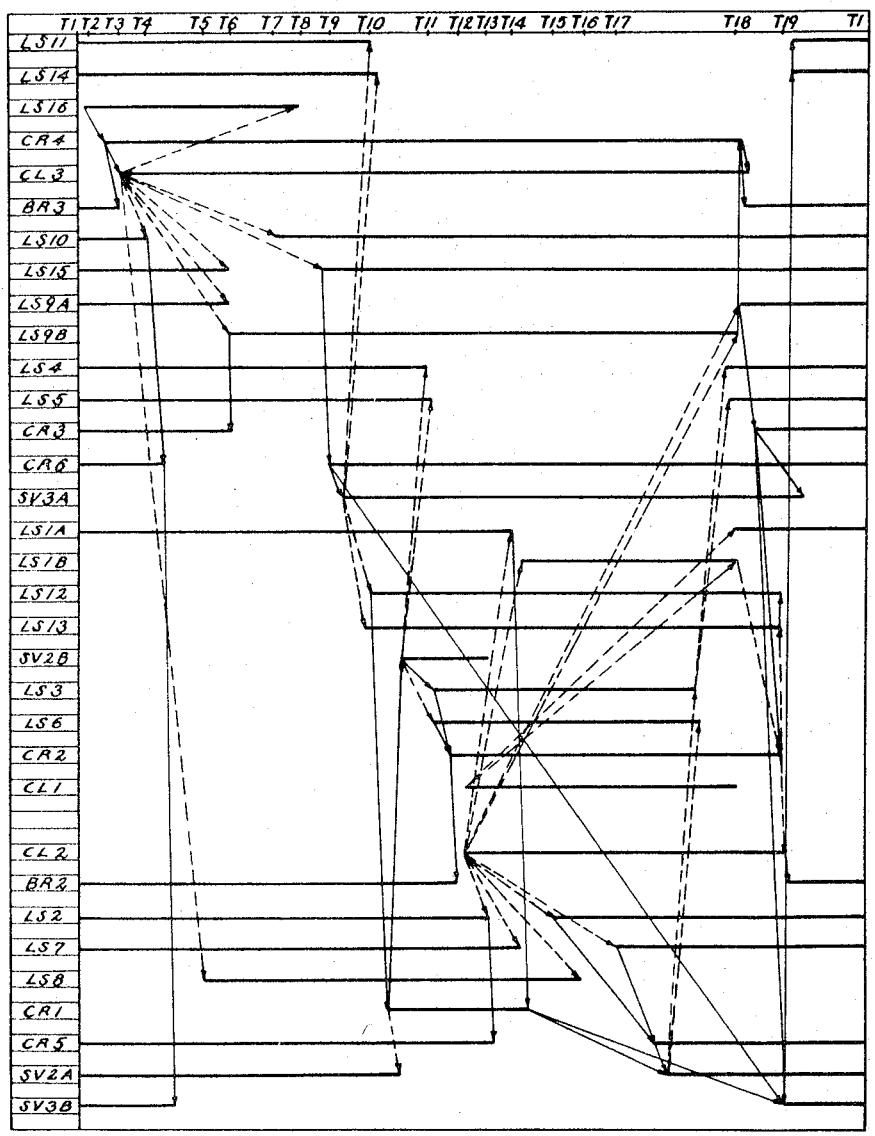
Figure 32:
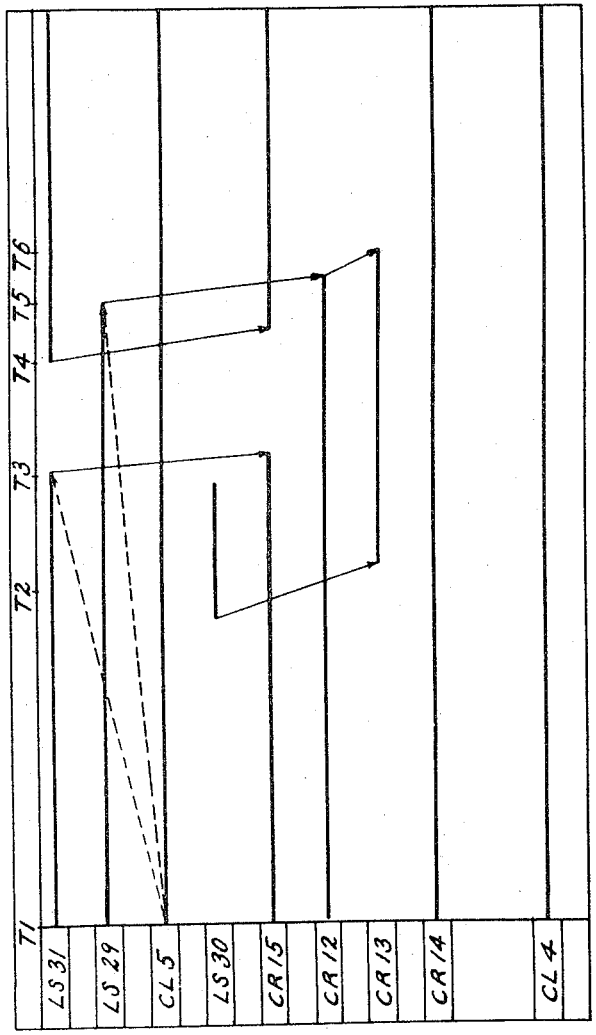

FIGS. 14a and 14b together constitute an electrical diagram of the control circuit, of the band-positioning apparatus, drum loader and rotational lock apparatus;

FIG. 15 is a sequence chart to aid in explaining the operation of the band-positioning apparatus;

FIG. 16 is a schematic diagram of the hydraulic system utilized in the band-positioning apparatus;

FIG. 17 is an elevational view of the input portion of the drum loader of the FIG. 1 apparatus;

FIG. 18 is an elevational view of the remaining portion of the drum loader;

FIG. 19 is a plan view of the drum loader representing the overhead drive rolls;

FIG. 20 is an output end view of the drum loader, taken along line 20—20 of FIG. 18;

FIG. 21 is a plan view taken along line 21—21 of FIG. 17;

FIG. 22 is a plan view of the remaining portion of the drum loader taken along line 22—22 of FIG. 18;

FIG. 23 is an input end view of a portion of the drum loader, taken along line 23—23 of FIG. 1;

FIG. 24 is an enlarged fragmentary view in section of a clamp of the drum loader;

FIG. 25 is an enlarged view in section of the cam of the FIG. 1 apparatus, taken along line 25—25 of FIG. 21;

FIGS. 26a and 26b are views, partly schematic, representing the relation of the cam to the various units of the apparatus;

FIGS. 27a–27d, inclusive, are enlarged fragmentary views of portions of the cam of FIG. 26;

FIG. 28 is a schematic diagram of the pneumatic control system of the drum loader;

FIG. 29 is a sequence chart to aid in explaining the operation of the drum loader;

FIGS. 30a–30k and 30m–30o are fragmentary sectional views representing the intercoupling between drums along the cam;

FIG. 30p is an end view of drum 2, taken along line 30p—30p of FIG. 30o;

FIG. 30q is an enlarged fragmentary view, in section, of portion J of the cam to represent the actuation of the drum fingers;

FIGS. 30r–30u are plan views of drums along apparatus between the drum loader and the first turret to represent the intercoupling between drums;

FIG. 31a is a fragmentary plan view to show apparatus checking the first rotational lock between drums;

FIG. 31b is a view, in section, taken along line 31b—31b of FIG. 31a, of the first rotational lock apparatus;

FIG. 31c is a view in section of a roller, taken along line 31c—31c of FIG. 31b;

FIG. 32 is a sequence chart to aid in explaining the operation of the first rotational lock apparatus.

*General description and explanation of operation of FIG. 1 apparatus*

Referring now more particularly to FIG. 1 of the drawings, the apparatus continuously handles, for example, fifty drums, including drums 1–4. As will be described more fully subsequently, each drum preferably is a rigid metal cylinder with a hollow central region, having a grooved cone attached to one end of the drum and a cam-actuated set of locking fingers attached to the other end of the drum. A pair of annular bands are slidably mounted at the ends of each drum for supporting fabric between drums, as will be apparent subsequently.

The first unit of the apparatus is a band-positioning apparatus 100 for extending the retractable bands of the drums. To this end, a pair of displaceable arms having fingers grip the bands while each drum is in the band-positioning apparatus.

The second unit is a drum loader 200 successively moving the drums into a line of interconnected drums. The drum loader moves the drums along an elongated cam 203 which extends through the machine. The drum loader 200 has an electrically interlocking set of two piston-operated clamps 201, 202 which holds the cam 203 rigidly, in cooperation with the drums, as will be more fully explained subsequently. The clamps 201, 202 open and close alternately so that each drum can be moved onto the cam in a series of three steps. When a drum is first introduced into the drum loader 200, the first set of clamps 201 automatically opens. The drum is then pushed between clamps 201 and 202, the clamps 201 close on the cam, and the clamps 202 open. The drum is then pushed forward so that each drum locks with the drum ahead or downstream by means of the locking cone and fingers which select a groove of the cone. The locking of the drums is controlled by the position of the drums along the cam 203 which has a stepped diameter along its length to actuate the fingers.

The interlocked drums are then driven through a winding frame 300 having a series of driving wheels located in line at the bottom of the drums and on each side of the drums. These wheels are rotatable to drive the drum forward and are mounted in swivels so that they can be adjusted in angle to impart the correct rotating and longitudinally advancing motion to the drums. Fabric is applied to the interlocked set of drums from a let-off frame 400 mounted on one side of the unit 300 and adjusted to cause the fabric to wind onto the drums at a predetermined cord angle.

As the drums advance through the winding frame they move to a fabric cutting unit 700. The fabric cutting unit includes a high speed rotary knife so mounted on a frame as to permit it to be revolved circumferentially around the drums. The knife is mounted so that on signal it cuts the fabric circumferentially between the drums. The cutting unit is mounted on a carriage synchronized with the speed of the longitudinal advance of the drums, and a signal is supplied to the cutting unit by means of an electrical contact made by the drum moving over a contact ring on the cam to cause the fabric cut to be made exactly between two adjacent drums.

After the fabric is cut, the drum advances over a portion of the cam which opens the locking fingers and frees the drum from the following drum. A transfer unit 800 of rollers then advances the drum to lock it automatically on the preceding drum which is rotating and moving longitudinally into a second winding frame 300A. The transfer unit 800 permits the drum to rotate freely about its longitudinal axis. The cam 203 in this portion of the apparatus has a diameter causing the fingers of the preceding rotating drum to interconnect with a different groove on the cone of the drum on the transfer unit. Accordingly, the drum is automatically locked onto the preceding drum with a new and different distance between drums. The drums are then advanced through the second winding unit 300A which is similar to the winding unit 300 and is supplied with fabric from a let-off unit 400A similar to the unit 400. The units 300A and 400A preferably are of opposite hand to the units 300 and 400 to permit crossing fabric plies. Thereafter, the second ply is cut by a cutting unit 700A similar to the cutting unit 700.

The drums are then moved to a turret loader 900 for loading a swivel turret 1000 which grips each drum by means of a pneumatic chuck. The drum is then swung by the turret 1000 to a bead setter 1300 supplied with bead wires by a bead servicer 1500. The bead setter 1300 automatically positions a wire bead over the carcass plies. A set of cam-operated fingers simultaneously moves under the fabric and then grips the bead wire while a pneumatically inflated air bag located under a cage of the bead setter rolls the fabric over the top of the bead wire and makes a fabric turn-up.

The turret 1000 then rotates under the control of a Geneva Drive mechanism 1200 and transfers the drum to a second turrent 1100 with a pneumatic chuck for gripping the drum. The turret 1100 then rotates and positions the drum with respect to a second bead setter 1300A similar to the bead setter 1300. The bead setter 1300A is supplied with bead wires by a bead servicer 1500A similar to the bead servicer 1500 and applies the bead wire to the other end of the drum.

The turret 1100 then rotates the drum to a carcass remover 1700 where the carcass is clamped by a suitable mechanism and air is introduced under the carcass to permit the carcass to be pulled off the drum.

The carcasses may then be removed from the apparatus and stored for further processing, such as the application of tread stock, shaping and curing. The turret 1100 then rotates the drum to a return conveyor 1800 which transfers the drum to the band-positioning apparatus where the drum is introduced again into the line.

*Description of drum*

Referring now more particularly to FIGS. 2 and 3, a hollow drum 1 is represented in elevational end view in FIG. 2 and in cross section in FIG. 3, taken along line 3–3 of FIG. 2. The drum includes means for interconnecting drums with predetermined spacings therebetween. More particularly, this means comprises a plurality of movable fingers 50, 51, 52 at one end of the drum and a tapered or conical device 53 having a plurality of axially spaced circumferential grooves 54, 55 at the other end of the drum. The fingers of each drum are adapted to register with a selected circumferential groove in the cone of an adjacent drum for interconnecting the drums with predetermined spacings.

As represented in FIG. 3, the finger 50 is spring-loaded and pivoted on a pin 56 attached to a housing which in turn is attached to the drum wall and has a roller 57 which extends through a slot in a sleeve 58 for actuation by the stepped diameter of a cam 203 (FIG. 1) which extends longitudinally through sleeves of the drums as will be described more fully subsequently. One of the three fingers of each drum, for example, the finger 50 has a web 59 for interlocking with selected longitudinal ribs 53b and slots 53a to provide a rotational lock between drums at various stages of the operation.

Each drum also has a pair of displaceable bands 60, 61 mounted on rods 62, 63 at each end of the drum and slidable longitudinally of the drum. The bands are represented in FIG. 3 in an extended position in broken-line construction and the band 60 is also represented in a retracted position in solid-line construction.

*Description and explanation of operation of band-positioning apparatus 100*

Figure 6:
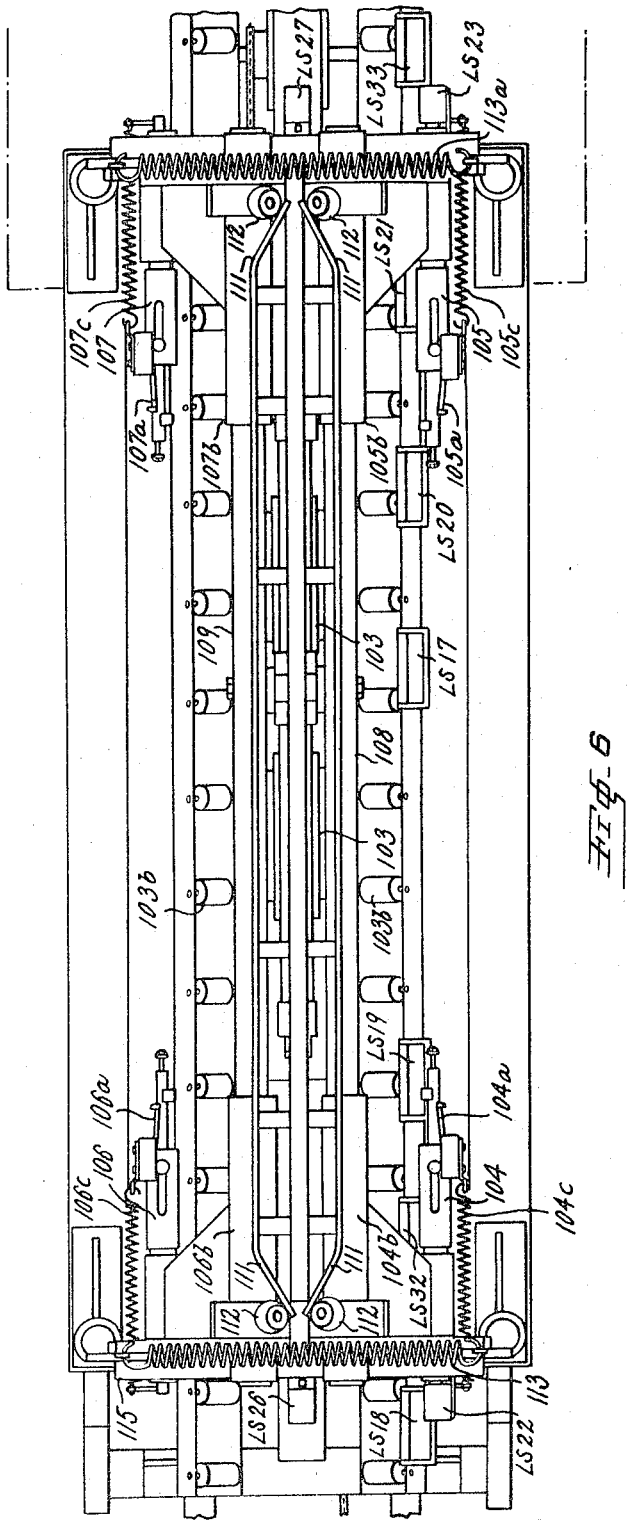
FIG. 6 is a plan view of the band-positioning apparatus with the drum clamp of FIGS. 5a and 5b removed for clarity.
Figure 9:
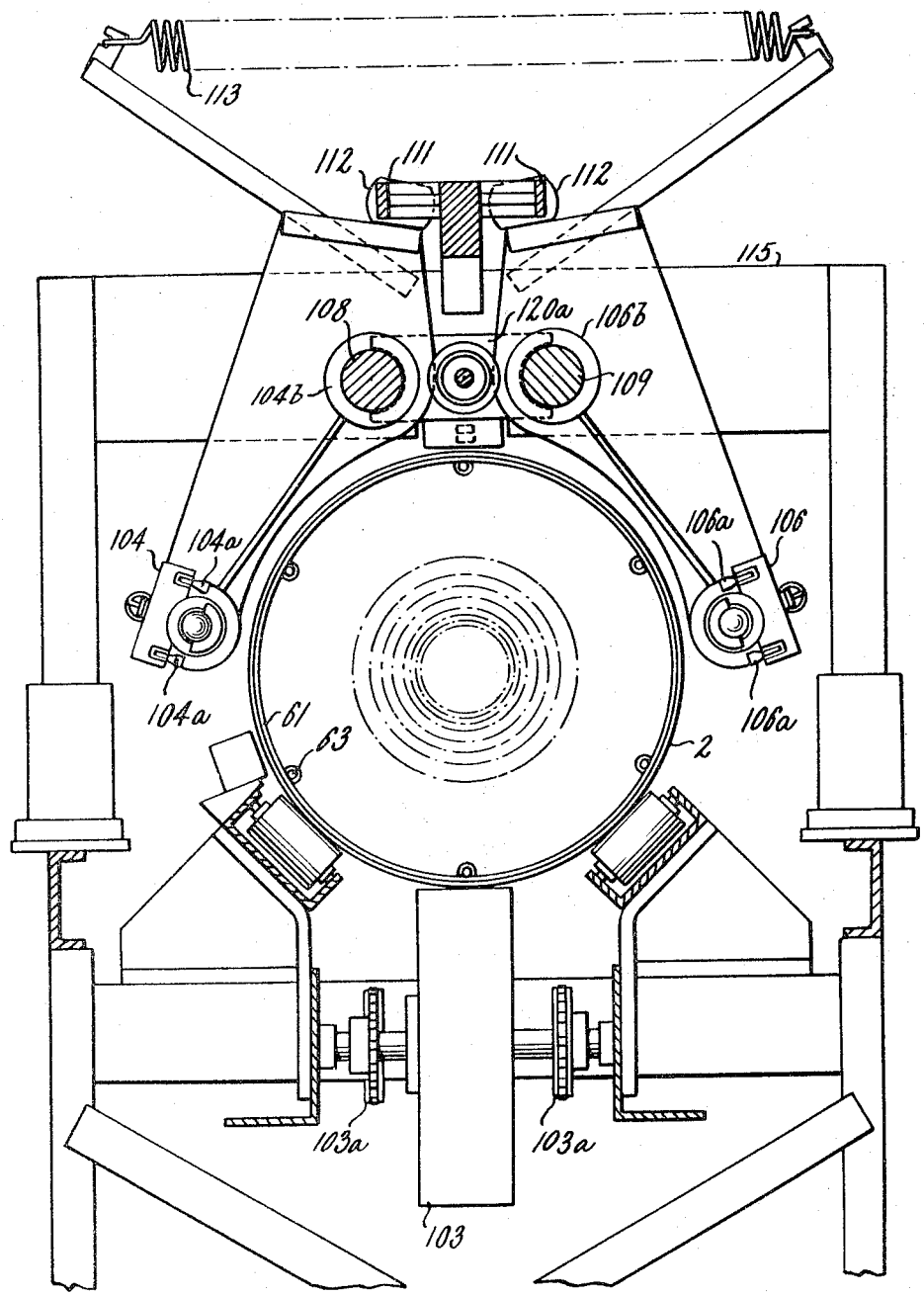
FIG. 9 is a sectional view of the band-positioning apparatus taken along line 9—9 of FIG. 4.

Referring now more particularly to FIGS. 4 and 5 of the drawings, band-positioning apparatus 100 is represented in fragmentary side elevational view. The band-positioning apparatus comprises a longitudinal support 102 having mounted thereon rollers 103, which are driven by the main drive motor and drive chain 103a through a unit including an electromagnetically actuated clutch CL1 and brake BR1 of conventional construction. A suitable brake 103c acts continuously against the first roller 103 of FIG. 4. Other non-driven support rollers 102b are represented in FIG. 6, which is a plan view of the apparatus.

The band-positioning apparatus comprises displaceable arms 104, 105, 106 and 107 represented in FIGS. 6, 7, 8, 9 having fingers for gripping the bands of the drum, as will be more fully described. The arms 104, 105, 106 and 107 comprise rods which are attached to frames 104b, 105b, 106b and 107b slidably mounted on bars 108, 109. Frames 105b and 107b are shown in section in FIG. 7, which is a plan view of the band-positioning apparatus with the arms 104–107 displaced to an intermediate position during their travel and with the tracks 111 broken away. As represented in FIGS. 7, 8, the frames 104b, 106b are rotatably held in a grooved collar 120a attached to piston rod 120 and frames 105b and 107b are rotatably held in a grooved collar 121a attached to piston rod 121 of hydraulic cylinders 122, 123 bolted to support bars 109, 108. Springs 104c, 105c, 106c, 107c (see FIGS. 5 and 6) maintain arms 104 and 106 and arms 105, 107 in a normally unextended condition. Springs 113, 113a (see FIGS. 6 and 9) maintain arms 104, 106 and 105, 107 in an outward position, forcing rollers 112 against tracks 111 attached to supporting frame 115 (see FIGS. 6, 9, and 11).

Figure 10:
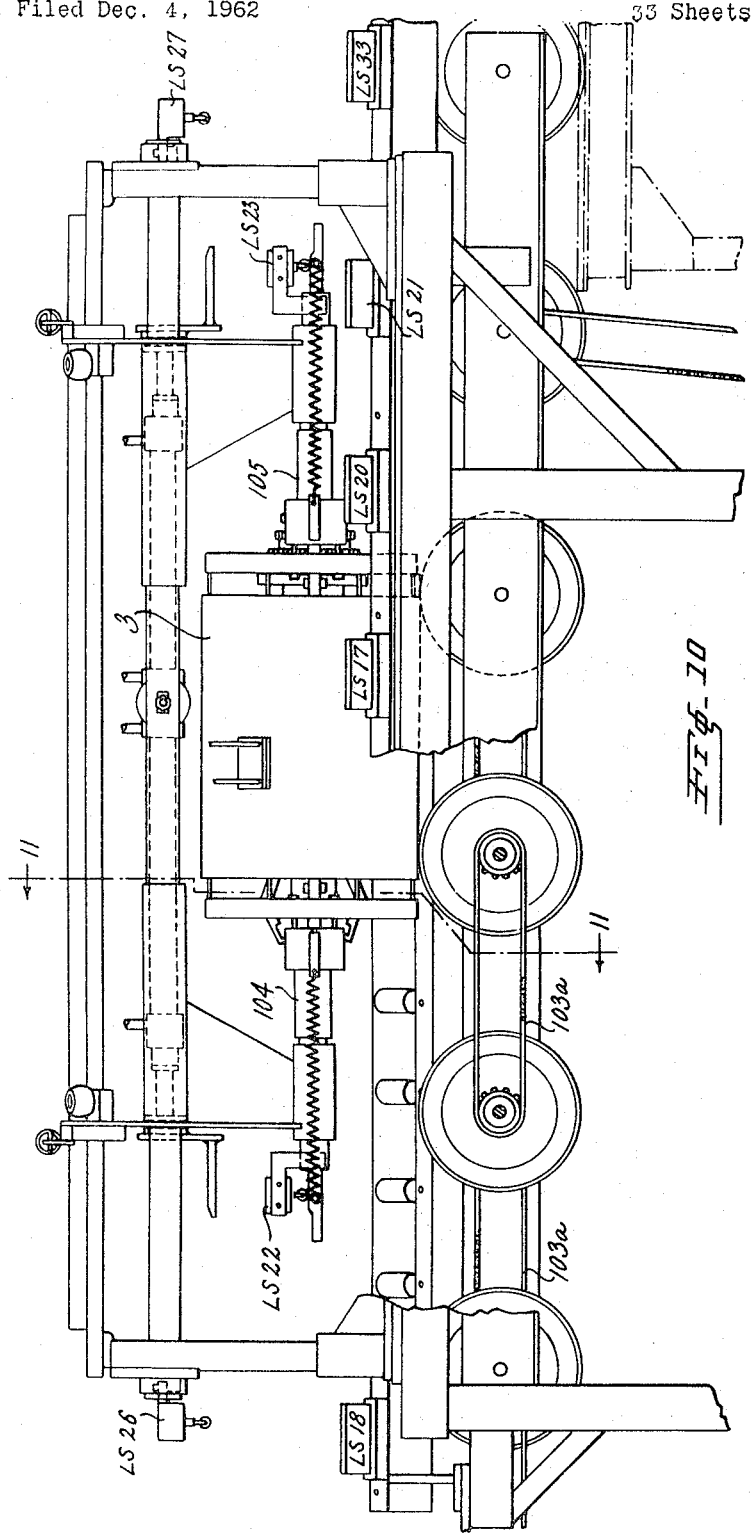
FIG. 10 is a fragmentary side elevational view of the band-positioning apparatus.
Figure 11:
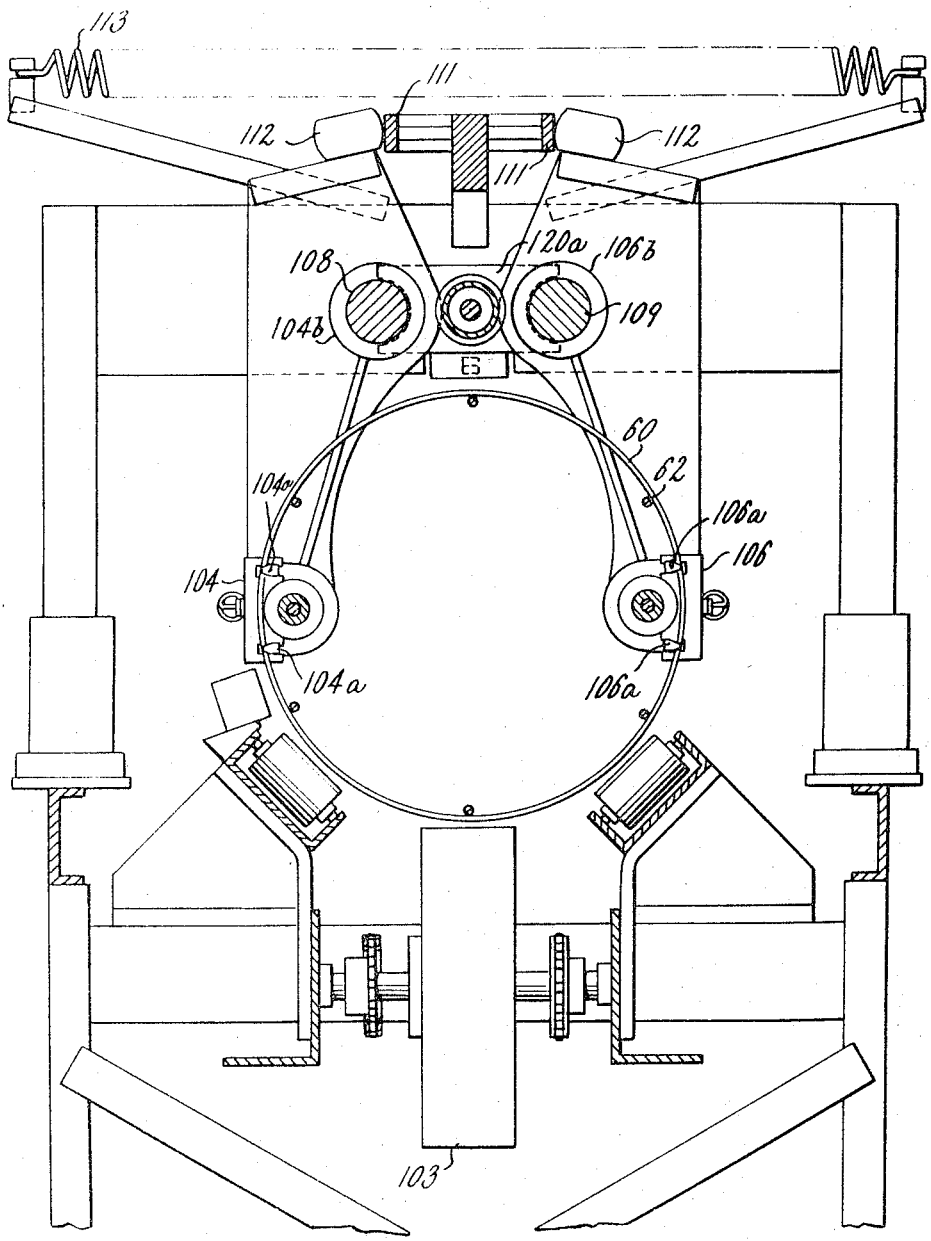
FIG. 11 is a sectional view of the band-positioning apparatus taken along line 11—11 of FIG. 10.

Referring now to FIGS. 10 and 11, when the arms 104–107 are displaced toward a drum as will be more fully explained, the arms are swung inwardly toward the drum as rollers 112 move along tracks 111. When the arms 104, 106 are in the position represented in FIG. 11, the fingers grip the band at the end of the drum. The sequence of operation is represented in FIGS. 12 and 13a–13e, inclusive. Referring to FIG. 12, the arm 105 comprises a rod mounted in a sleeve 121 and maintained in position by a spring 105c. When the plunger or shaft strikes the end of a drum the rod 105 slides within sleeve 121. As will be seen with reference to arm 107, when the rod slides, the finger 107a is released when the pin 123b attached to the rod moves away from the finger 107a along slot 124 in the sleeve. Thus, referring to FIGS 13a to 13e, inclusive, as the plunger 107d strikes the drum represented in FIG. 13b, the finger 107a moves away from the pin 123b supporting cam 123a. The finger 107a pivots at point 126 and slides beneath the band. The finger 107a is raised by spring 125 to position behind the band as represented in FIG. 13c when the arm assumes the position represented in FIG. 13c.

When the arm is retracted, as represented in FIG. 13d, the finger draws the band away from the drum surface and when the arm moves sufficiently away from the drum that the plunger 107d is in its initial extended condition the cam 123a of the finger 107a strikes pin 123b, causing the finger to drop and release the band.

Referring now more particularly to FIGS. 5, 5a and 5b, the band-positioning apparatus includes a suitable clamp for holding the drum in position while the bands are being extended. The clamp comprises a pair of friction surfaces 141 mounted on arms 140 pivoted at points 142 and actuated by links 143 under the control of a cylinder 144. The arms are represented in engagement with the drum with the piston of cylinder 144 in its fully extended position. When the piston of the cylinder is withdrawn from its fully extended position, the clamps are released.

In connection with the sequence charts such as FIG. 15, various electrical components involved in the operation under consideration are listed in a vertical column along each edge of the drawing. Horizontal component lines of varying length, extending alongside a particular vertical listing, indicate the relative period of time, for example from T1 to T2 as shown at the top of the charts, during which the electrical component is energized or given switch contacts are closed, as the case may be. The time axis merely indicates sequence and is not to scale. The diagonal solid line arrows starting at one horizontal component line and ending at another horizontal component line indicate that the first component electrically controls the second component. Similarly, the diagonal dotted line arrows starting at one horizontal component line and ending at another horizontal component line indicate that the first component mechanically controls the second component. The operation of a time delay relay is indicated by a dotted horizontal component line. The start of the dotted horizontal line indicates that the relay has been energized but that its time-delay contacts have not yet followed the movement of the relay or, conversely, that the relay has been de-energized but that its time-delay contacts have not yet followed this action. Where the horizontal dotted line becomes solid, it indicates that the delay function is ended. The solid-line associated with limit switches indicates that the contacts of the switches are closed.

Considering now the operation of the band-positioning apparatus with respect to the circuit diagram of FIGS. 14a and 14b, the sequence chart of FIG. 15, and the hydraulic diagram of FIG. 16, it will be assumed initially that at time T1 drums are positioned along the apparatus as represented in FIGS. 4 and 5. Drum 2 has its bands extended and drums 3 and 4 have their bands retracted. Limit switch LS28 is actuated by drum 3 and contacts LS28a (FIG. 14b, line 42) are closed, thereby causing energization of relay CR11 (line 42) from 110-volt power supply lines G1, G2. Relay contacts CR11a (line 41) are open, causing de-energization of solenoid valve SV8 (line 41), allowing the conveyor stop 1899 to block drum 4 as represented in FIG. 4. Control relay CR11 is maintained energized through relay contacts CR7a and CR11b (line 43).

Limit switch LS17 is actuated by drum 2 and contacts LS17a (line 36) assume their position alternate to that represented in the drawing. Latching relay contacts LR2a (line 36) are open because latching relay LR1 was the last of relays LR1 and LR2 to be energized. The relays LR1 and LR2 are of conventional latching relay construction in which the two relay windings actuate the same contacts in opposite sense and the contacts remain in the condition of actuation by one relay winding until the next energization of the other relay winding. The latch relay contacts are represented in FIG. 14b in the condition they assume when latch relay LR2 is the last relay previously energized.

Limit switches LS26 and LS27 are actuated by the extractor arms in their rest position and contacts LS26a and LS27a (line 40) are closed, causing energization of relay CR9.

Control relay CR16 (line 35) is energized through contacts TR1a of a suitable timer or time-delay relay TR1 (line 35A). Solenoid valve SV6B (line 32) is energized through latch relay contacts LR1a.

As will be more fully explained subsequently, at time T2 when the drum loader (FIG. 21) is ready to receive another drum, relay CR2 (line 7) is energized. Relay contacts CR2c (line 33) then close, causing energization of relay CR10 through relay contacts CR7b and CR9a. Relay contacts CR10a (line 27a) close, causing energization of the solenoid controlling clutch CL1 from a suitable direct-current power supply PW1, which is similar to supply PW4 (line 59) more fully described hereinafter. When clutch CL1 is actuated, drive is applied to rollers 103, causing drums 2 and 3 (FIGS. 4 and 5) to move ahead.

When drum 3 approaches switch LS18 at time T3, it actuates that switch, opening contacts LS18a (line 39) in series with control relay CR8. At time T4 drum 2 actuates switch LS20, opening contacts LS20a (line 39). At time T5 drum 2 leaves the vicinity of switch LS28, returning that switch to its unactuated condition with contacts LS28a (line 42) open. This relay sequence is effective to indicate the presence of drum interference and prevent energization of relay CR8 (line 39) which would permit motion of the arms 104, 105, 106, 107 if energized.

At time T6 drum 2 leaves the vicinity of switch LS17, returning that switch to its unactuated condition with contacts LS17a (line 36) returned to the position represented in FIG. 14. At this time latching relay LR2 (line 37) is energized through contacts LR2b (line 37) which immediately open to de-energize the relay and thereafter remain open. This removes power from SV6B, but the valve does not move, as it has a balanced spool. Relay contacts LR2a (line 36) close and remain closed. Relay contacts LR1a (line 34) also close in response to energization of relay winding LR2, holding relay CR10 energized.

Drums 2 and 3 continue to move along the apparatus. At time T7 while drum 3 is in the vicinity of switch LS18, drum 3 approaches switch LS32, actuating switch LS32 and opening its corresponding contacts LS32a (line 39). At time T8 while drum 2 is in the vicinity of switch LS20, drum 2 approaches switch LS21, actuating that switch and opening its corresponding contacts LS21a (line 39). At time T9 drum 1 leaves the vicinity of switch LS20, causing that switch to return to its unactuated condition, closing contacts LS20a (line 39). At time T10 drum 3 leaves the vicinity of switch LS18, causing switch LS18 to return to its unactuated condition, closing contacts LS18a (line 39). At time T11 drum 2 approaches switch LS19, actuating switch LS19 and opening its corresponding contacts LS19a (line 39). At time T12 drum 2 approaches switch LS33, actuating that switch to open contacts LS33a (line 39). At time T13 drum 3 leaves the vicinity of switch LS32, causing that switch to return to its unactuated condition and closing its contacts LS32a (line 39). At time T14 drum 2 leaves the vicinity of switch LS21, causing it to return to its unactuated condition, closing contacts 21a (line 39). At time T15 drum 3 leaves the vicinity of switch LS19, causing it to return to its unactuated condition closing its contacts LS19a (line 39). At time T16 drum 2 leaves the vicinity of switch LS33, causing it to return to its unactuated condition and closing its contacts LS33a. This relay sequence is effective to indicate the presence of drum interference and prevent the energization of relay CR8 during the interval T3 to T16. Drum 2 then enters the drum loader to be described subsequently.

At time T17 drum 3 actuates limit switch LS17, causing the contacts LS17a (line 36) to shift to the position alternate to that represented in the drawing, causing energization of relay CR7 and time-delay relay TR1 through contacts LR2a. When relay CR7 is energized, the solenoid which controls drive brake BR1 (line 27B) is actuated through contacts CR7a and contacts CR16a connected to power supply PW1. When relay CR7 is energized, relay contacts CR7b (line 33) open, de-energizing relay CR10 (line 33) and contacts CR7a (line 43) open, de-energizing relay CR11 (line 42). When relay CR11 is de-energized as drum 3 moves off switch LS28, contacts CR11a (line 41) close, causing solenoid SV8 to be energized and withdraw the conveyor stop, allowing drum 4 to travel forward into the band-positioning apparatus. When relay CR10 is de-energized, relay contacts CR10a (line 27a) open, causing the band reset drive clutch CL1 to return to its unactuated condition. Accordingly, the band reset drive is disengaged at this time and drum 3 stops in the position represented in FIG. 10.

When timer TR1 is energized after a delay of approximately one second contacts TR1a (line 35) open, de-energizing relay CR16. When relay CR16 is de-energized, relay contacts CR16a (line 27b) open, de-energizing the brake BR1.

When relay CR7 is energized, relay contacts CR7d (line 57) open and CR7c (line 31) close, causing energization of solenoid valve SV6A through latching relay contacts LR1 and relay contacts CR8a. Control relay CR8 is energized only when limit switches LS32, LS18, LS19, LS20, LS21 and LS33 have all returned to their unactuated condition and thus signal that no drum remains in the vicinity of these switches. At this time contacts CR8b (line 56) also close.

When relay CR7 is energized and solenoid valve SV6A is energized, the band reset arms 104, 105, 106, 107 start to move toward drum 3 through the operation of the hydraulic cylinders 122, 123 represented in FIG. 16.

When solenoid SV6A is energized, the valve shifts position from that represented in FIG. 16 to apply hydraulic fluid to the outward sides of the pistons of the cylinders 122 and 123 and to release fluid displaced by the inward sides of the pistons through the restrictions of valves 131 and 132, thus shifting the arms toward the drum to make ready to extend the bands of the drum.

At time T18 when the reset arms leave the limit switches LS26 and LS27, the limit switch contacts LS26a, LS27a (line 40) open, de-energizing relay CR9. Contacts CR9a (line 33) close, contacts CR9c (line 27B) open, contacts CR9d (line 57) open, and contacts CR9b (line 31A) open.

At time T19 relay CR2 (line 7) in the drum loader is de-energized as will be explained more fully hereinafter. At time T20 when the reset arms contact the drum, the reset arm plungers 104d, 105d, 106d, 107d are depressed, actuating switches LS22 and LS23 (FIG. 7). At this time the fingers 104a, 105a, 106a, 107a grip the band as represented in FIGS. 13a–13e. Contacts LS22a (line 38) and LS23a close, energizing relay LR1 (line 38). Relay contacts LR2a (line 36) open in response to energization of relay LR1 (line 38), de-energizing relay CR7 (line 36) and time delay relay TR1 (line 35A). Relay contacts TR1a (line 35) close after a time delay of approximately one second, causing energization of relay CR16 at time T21, closing contacts 16a (line 57).

At time T20 when relay CR7 is de-energized, relay contacts CR7c (line 31) open, causing de-energization of solenoid valve SV6A (line 31). When relay LR1 is energized, contacts LR1a (line 32) close, energizing solenoid SV6B (line 32) and SV9 (line 31A). When solenoid SV6B is energized, the valve shifts to the position represented in FIG. 16 to start the reset arms back to their original condition, pulling the bands as represented in FIGS. 13a–13e. This occurs when the cylinders 122 and 123 of the band-positioning apparatus are returned to the condition represented in the drawing and hydraulic fluid is applied through check valves 131 and 132 to the inward sides of the pistons of cylinders 122 and 123. Fluid is released from the outward sides of the pistons through restrictions of valves 130 and 133.

Energization of solenoid SV9 shifts the valve to clamp the drum in position while the bands are being extended, by actuation of cylinder 144, FIG. 5a, as previously described.

When relay LR1 is energized, relay contacts LR2c (line 27B) close, causing energization of brake BR1 (line 27B) since relay CR9 is de-energized.

At time T22, when the reset arms have returned to their original condition, limit switches LS26 and LS27 are actuated, closing contacts LS26a (line 40) and LS27a. This causes energization of relay CR9, opening contacts CR9c (line 27B) and de-energizing brake BR1. Also relay contacts CR9b (line 31A) open, causing de-energization of solenoid valve SV9 to release the drum clamps.

As drum 4 approaches limit switch LS28 at time T23 contacts LS28a (line 42) close, energizing relay CR11. When relay CR11 is energized contacts CR11a (line 41) open, de-energizing the solenoid valve SV8 and extending the conveyor stop to hold drum 5 in position.

The following sequence of the apparatus then is similar to that just described to extend the bands on the next drum 4.

A two-position manual-automatic switch S5 (lines 28 and 29 and 32) is represented with its contacts in automatic position and a three-position manual-automatic switch S6 (lines 31A and 32) is represented with contacts in automatic or reference position. The two manual positions move the contacts schematically up and down from the reference position. In the manual position of S5, the automatic operation of the circuit is prevented by removal of power from a large part of the circuit as shown, and power is supplied to S6 to permit manual control of SV6A and SV6B, thus also of the motion of the arms 104, 105, 106, and 107. Pushbuttons, such as PB1-A (line 52) and PB1-B (line 56), also may be utilized during manual operation.

Manual-automatic switches S2, S3, S4 (lines 1, 8, 16) are also represented in their automatic positions.

Description and explanation of operation of drum loader 200

Referring now more particularly to FIGS. 17, 18, 19, and 20 of the drawings, the drum loader comprises a pair of clamps 201 and 202 for supporting a central cam or "torpedo" 203 which extends along the apparatus as more fully described subsequently. A series of overhead rolls 204 are driven from the main drive shaft through a gear box 205a, a suitable chain drive 205 and electromagnetic clutches CL2, CL3, and electromagnetic brakes BR2 and BR3, for moving or stopping the drums along the drum loader. Referring to FIGS. 21 and 22, which are sectional views taken along lines 21—21 and 22—22 of FIGS. 17 and 18, respectively, the drums rest on a suitable support 207 having rollers 208 along its length.

At the output end of the drum loader the drums rest on suitable ball bearings 208a on the support 207. As represented in FIGS. 17–20, inclusive, the drums at the output end of the drum loader are driven by a pair of rollers 230, 231 through a suitable chain drive 240 and electromagnetic clutches CL4 and CL5. The rollers 230 and 231, represented in FIGS. 20 and 22 are rubber-covered rollers keyed to and slidably mounted on rods 230a, 231a and positioned against collars 230b, 231b by springs 230c, 231d.

Referring to FIG. 23, the clamp 201 moves from the open position represented in solid-line to the closed position represented in broken-line to support the cam 203. The clamp 201 is hydraulically actuated by a pair of cylinders 220 and 220b connected to the supporting base 221 of the one-half of clamp which slides along guide rods 222. Clamp 202 is similarly mounted, and actuated by cylinders 260a and 260b.

Considering now the construction of the cam 203 with reference to FIGS. 24, 25, 26a and 26b, the cam 203 comprises a tube of varying diameter for controlling the interconnection of the drums in accordance with the position of the drums along the cam. The cam is fixedly positioned with respect to the support 207 (FIG. 21) and extends longitudinally through the drums for actuating the connecting means of the drums, as represented in FIGS. 26a and 26b. As represented in FIGS. 24 and 25, the cam also carries internal electrical wiring 250 to clamps 201 and 202. The wires 250 are connected to suitable pins 251 in the cam and connections are made to the pins by spring-loaded fingers 252 in the clamps 201 and 202. The fingers 252 are slidably mounted in a suitable insulating support 253 attached to the clamp.

Referring now more particularly to FIGS. 26a and 26b and FIGS. 27a–27d, FIGS. 26a and 26b represent the cam 203 in relation to the various units of the apparatus. FIGS. 27a–27d, in enlarged view, represent more clearly the stepped diameters of the cam 203. The cam 203 controls the position of the locking fingers 50, 51, 52 (FIG. 3) of the drums. Generally, portion I is the region where the drums are individually placed on the cam. Portion II is the region where the drums are locked together with the fingers in the recess or groove 55 (FIG. 3). Portion III is the region where the drums are unlocked, respaced and relocked with the fingers in the groove 54 (FIG. 3). Portion IV is the region where the drum is removed from the cam and placed on a turret.

The cam is held in axial position by the clamps 201, 202 at portion I but the cam weight is carried by the drums themselves. This is done at portions A, E, J and K by increasing the cam diameter to correspond with the inside bore of the drums. The main parts of the cam are made of thin wall aluminum tubing and the diameters C and G of the cam match the locked diameters of the rollers when the fingers are in the grooves, 55 and 54, respectively (FIG. 3). Therefore, the spring-loaded fingers support the cam through the winding frames.

Considering now in greater detail the diameters of the cam, portion A is a full diameter region, for example, 2.5 inches diameter, and maintains the cam in center position by the drums which in turn are centered at this point by the support rollers 208 and ball bearings 208a. The cam is preferably centered adjacent to any area where the fingers are shifted from one position to another. This re-centering insures accuracy of finger position.

Portion B is a region of reduced diameter, for example, 2.168 inches to allow the fingers on the trailing end of the drum to open to an "index" diameter corresponding to a diameter greater than the diameter of the front wall but less than the diameter of the rear wall of the groove 55. Portion C is a further reduced diameter, for example, 2.0 inches, to allow the fingers to drop into the groove 55. Portion D corresponds to an increased diameter of, for example, 2.168 inches corresponding to the index diameter to unlock the drums from the drums in the first winding frame but to continue to push the drum at line speed. Portions B and D are identical in diameter. Portion E is a region of full diameter to re-center the cam in the drum. Portion F is a region of reduced diameter, for example, 2.015 inches to allow the fingers to be set at a second index diameter for the other groove 54 preparatory to winding the second ply. The second index diameter is greater than the diameter of the front wall but less than the diameter of the rear wall of the groove 54. Portion G is of further reduced diameter, for example, 1.875 inches to allow the fingers to drop into the groove 54. Portion G contains a conductive annulus 254 mounted in a suitable insulator 255 and connected by wire 250 to one of the contacts 251 of FIG. 25, for a purpose explained hereinafter. Portion C of FIG. 27c contains a similar conductive annulus also connected to one of the contacts 251 of FIG. 25. Portion H is a region of increased diameter, for example, 2.015 inches corresponding to the second index diameter to allow the fingers to move out of the groove 54, disconnecting the drum from the line but pushing the drum at line speed. Portion K is a region of full diameter. Portion J is of full diameter but notched.

Considering now the operation of the drum loader, as previously mentioned, at time T16 in the cycle of operation of the band reset apparatus, while limit switch LS33 is actuated, drum 2 enters the drum loader. The operation of the drum loader will now be explained with reference to a time sequence represented in FIG. 29 and with reference to FIGS. 14a and 14b. In FIG. 17 drum 2 is represented as moving into the drum loader. This occurs at time T12 of FIG. 29 which corresponds to time T16 of FIG. 15. The time axes of FIGS. 15 and 29 are referenced independently for clarity of explanation.

In considering the operation, it will be assumed initially that at time T1 (FIG. 29) clamp 201 is closed, clamp 202 is open and that drum X is in the vicinity of switch LS16. Drum 1 is in the vicinity of switch LS8. Drum 2 is in the vicinity of switch LS1 and drum 2 is in the position represented in FIG. 4. Drive mechanism CL2 and CL3 are not effective to drive the rollers 204 for reasons to be explained. When clamp 202 is open, switch LS11 (FIG. 22) is actuated by the clamp support and is closed, and switch LS14 (FIG. 22) is actuated by the clamp support and is closed. At time T2 when drum X driven by rollers 230, 231 moves ahead of switch LS16 (FIG. 14, line 13), switch LS16 closes, actuating relay CR4 (line 13). When relay CR4 is energized, contacts CR4a (line 26) close, energizing the solenoid of clutch CL3 (line 26) through power supply PW2, and contacts CR4B (line 27) open, de-energizing the solenoid of brake BR3 to bring into operation the drive mechanism 3 rotating rollers 204a. Drum 1 then advances and actuates limit switch LS10 (line 15) opening that switch. At time T4 when limit switch LS10 opens, control relay CR6 is de-energized, opening contacts CR6a (line 22) and CR6b (line 23), de-energizing solenoid SV3B, and preventing any motion of clamp 202 which is open at time T4.

At time T5 drum 1 leaves the vicinity of switch LS8 (line 5), allowing that switch to close. At time T6 drum 1 leaves the vicinity of switch LS9 (line 11), causing the switch contacts 9A to open and contacts 9B to close. Control relay CR4 is now held in an energized condition through switch contacts LS9B (line 11) to cause drive CL3 to continue to operate rollers 204a. Relay CR3 is then de-energized closing contacts CR3a (line 21) and CR3b (line 22). At time T6 the drum 1 also actuates switch LS15 (line 15), opening that switch. Drum 1 then leaves the vicinity of switch LS10 (line 15), causing that switch to close at time T7. At time T8 drum 1 actuates switch LS16 (line 13), opening that switch.

At time T9 when drum 1 leaves limit switch LS15 (line 15), closing that switch, control relay CR6 is energized, closing contacts CR6b (line 23) and closing contacts CR6a (line 22) to energize solenoid valve SV3A and closing the clamp 202 to grip the cam 203.

Referring for the moment to FIG. 28, when solenoid valve SV3A is energized, the valve assumes the position represented in FIG. 28, actuating cylinders 260, 260b through valves 261, 264.

At time T10, when clamp 202 closes, limit switches LS11 (line 13) and LS14 (line 13) open and limit switches LS12 (line 5) and LS13 (line 5) close, energizing relay CR1 (line 5). Contacts CR1a (line 21) close, energizing solenoid SV2B (line 21) since contacts CR3a and CR5 are closed and opening clamp 201 by actuating cylinders 220, 220b, as represented in FIG. 28. Contacts CR1b (line 20) open, de-energizing solenoid SV2A, and contacts CR1c (line 23) open.

At time T11 when clamp 201 is opening, limit switches LS4 (line 11) and LS5 (line 11) return to their unactuated open condition.

At time T12 when clamp 201 is fully open, limit switches LS3 and LS6 (line 7) close, energizing relay CR2. At this time, as represented in FIG. 17, drum 2 is in the vicinity of switch LS1 (line 5) and the switch is actuated with contacts LS1A closed and the contacts LS1B open. At time T12 when control relay CR2 is energized, control relay contacts CR2a (line 25) open, de-energizing the solenoid of brake BR2 (line 25). Contacts CR2b (line 24) close, energizing the solenoid of clutch CL2 (line 24). The drive mechanism CL2, is then in an operating condition, rotating rollers 204, and drum 2 advances.

As the drum 2 advances, the drum actuates limit switch LS2 (line 14) at time T13, opening that switch and de-energizing relay CR5 (line 14). Contacts CR5a (line 20) and CR5b (line 21) open, preventing movement of clamp 201. Clutch CL1 is also actuated at time T13, as previously explained in connection with the cycle of the band-positioning apparatus at time T3. At time T14 the drum 2 leaves the vicinity of switch LS1 (line 5), which switches to its unactuated condition with contacts LS1A open and contacts LS1B closed. Relay CR1 is then de-energized, closing contacts CR1b (line 20) and CR1c (line 23). At time T14 the drum 2 actuates switch LS7 (line 14), opening the switch contacts. At time T15, switch LS2 closes.

At time T16 the drum 2 actuates switch LS8 (line 5), opening that switch. At time T17 the drum 2 leaves the vicinity of switch LS7 (line 14), closing the switch and energizing relay CR5 (line 14). Contacts CR5a (line 20) close, energizing solenoid SV2A (line 20) and closing clamp 201, opening switches LS3 and LS6, and closing limit switches LS4 (line 11) and LS5 (line 11) at time T18.

At time T18 the drum 2 actuates limit switch LS9 (line 11), closing contacts LS9A and opening contacts LS9B. Relay CR4 (line 13) is de-energized, closing contacts CR4b (line 27) and energizing the solenoid of brake BR3 (line 27). Contacts CR4a (line 26) open, de-energizing the solenoid of clutch CL3 (line 26) to stop drive of rollers 204a with the drum 2 in the vicinity of LS7 (line 14) and LS9 (line 11), and drum 1 in the vicinity of switch LS16 (line 13).

At time T18 when contacts LS9A (line 11) of switch LS9 close, relay CR4 is de-energized (line 13) and relay CR3 is energized (line 11). Relay contacts CR4a (line 26) open, de-energizing the clutch CL3 and relay contacts 4b (line 27) close energizing brake BR3 from power supply PW2. Relay contacts CR3a (line 23) close, energizing solenoid SV3B to open clamp 202, actuating switches LS11 and LS14 and returning switches LS12 and LS13 to their unactuated condition. Contacts 3b open, de-energizing solenoid SV3A.

Also at time T18 drum 3 from the band-positioning apparatus 100 arrives at the drum loader 200 and actuates switch LS1 (line 5), closing contacts LS1A and opening contacts LS1B to de-energize relay CR-2 (line 7). Relay contacts CR2b (line 24) open, de-energizing the solenoid of clutch CL2. Relay contacts CR2a (line 25) close, energizing the solenoid of brake BR2 from power supply PW3. The drive mechanism CL2, BR2 controlling rollers 204 is then stopped with the drum 3 in the drum loader 200. Clutch CL1 is de-energized at time T18 as previously explained in connection with the cycle of the band-positioning apparatus at time T18. The operating cycle then repeats.

FIGS. 30a to 30o, inclusive, represent sectional views of drums X and Y corresponding to views along lines 30a—30a of FIG. 2 to represent the coupling of the drums at various positions along the apparatus. The drum Y is in the drum loader but is connected to a line of drums in the winding frame 300 and is rotating with them. As represented in FIG. 30a, the fingers of drum Y are opened when actuated by portion A of the cam 203 in the drum loader. As represented by FIG. 30b, the fingers of drum Y close slightly when actuated by portion B of the cam which has a reduced diameter to set the fingers at first index position prior to interconnection with the second recess 55 of the drum. The drum X is then driven by the roller 231 (FIG. 22) at a speed which is slightly faster than the speed of the drum Y. As represented in FIG. 30c, when the following drum X approaches the fingers of drum Y, the rear wall of the recess 55 strikes the fingers. As represented in FIG. 30d, the cam diameter is reduced in portion C and the finger 52 drops into the recess 55 while the finger 50 may be temporarily maintained out of the recess by the web of the finger. While the drum Y rotates, the fingers of the drum Y rotate around the cone of the following drum X until the web of the finger 50 drops into a slot of the cone as represented in FIG. 30e. A rotational lock between drums X and Y is thereby provided and both drums then continue to rotate.

Referring now more particularly to FIGS. 18, 22, 31a, 31b, and 31c, apparatus is provided for checking that a rotational lock between drums X and Y has been accomplished. More particularly, this apparatus includes a pair of slidable rollers 260, 261 and a limit switch LS30 actuated by the roller 261. The roller 261 is represented partially in section in FIG. 31b and also in section in FIG. 31c. The roller is suitably covered with a soft high friction material such as rubber and is mounted on a shaft 262 having grooves therein for receiving balls 264 from races 265 of the roller. A suitable spring 266 maintains the roller normally in the position represented in the drawing so that switch LS30 is normally unactuated. When a rotating drum travels over the roller 261, the roller slides along the shaft 263 to actuate the switch LS30. The rollers 260 and 261 are coupled with a rounded surface on one roller in contact with a drum while a flattened surface of the other roller does not contact the drum, allowing the latter roller to return to its normal position.

Considering now the operation of the first rotational lock apparatus with reference to FIGS. 14a, 14b, 18 and 32, it will be assumed initially that switch LS29 (line 51) and switch LS31 (line 50) are actuated by drum X. The solenoid of clutch CL4 (line 60) and the solenoid of clutch CL5 (line 61) are energized through suitable direct-current power supplies PW4 and PW5 and through contacts CR14b (line 59). Power supplies PW1–PW5, inclusive, may all be of similar construction to that represented as power supply PW4, comprising a full-wave rectifier with suitable output circuits. At time T1 of this sequence, relays CR15 (line 50), CR12 (line 51) are energized. Contacts 12b (line 56) and 13b are closed, maintaining energization of relay CR14 (line 57). At least one of each of the following pairs of contacts of lines 56 and 57 must be closed to keep fail relay CR14 energized: 2d, 5c; 4c, 6c; 8b, 7d; 16a, 9d; 12b and 13b, 15a. The 2d, 5c pair of contacts indicates either clamp 201 is open or there is no drum interference to closing. The 4c, 6c pair of contacts indicates the same with respect to clamp 202. The 7d, 8b pair assures that if the band reset arms are moved from the rest position with a drum actuating any of the switches in line 39, FIG. 14B, there will be de-energization of relay 14. The 16a, 9d pair assures that if arms do not leave rest position before timer contacts TR1/a (line 35) open, the relay CR14 will be de-energized. Pushbutton PB2 (line 57) is a manual control for de-energizing relay CR14.

Providing that a rotational lock between drums X and Y has been obtained, limit switch LS30 (line 53) is closed at time T2 for a brief interval, energizing relay CR13 (line 53). Relay contacts CR13a (line 54) close, holding relay CR13 energized through relay contacts CR14e and CR12a. Relay contacts CR13b (line 56) are also closed.

At time T3 drum X leaves switch LS31 (line 50), opening that switch and de-energizing relay CR15. However, since relays CR12 and CR13 are energized, relay CR14 remains energized.

Before drum X leaves the vicinity of switch LS29 at time T5, drum 1, driven by rollers 230 and 231, operates switch LS31 (line 50) at time T4, thus closing switch LS31 and energizing the relay CR15 (line 50). Relay contacts CR15a (line 57) close to complete a holding circuit for relay CR14. Relay contacts CR15b (line 52) used during manual operation also close. With the line of drums still moving, the drum X leaves the vicinity of switch LS29 (line 51) at time T5, opening that switch and de-energizing relay CR12 (line 51). The relay contacts CR12a (line 54) open, de-energizing relay CR13.

If no rotational lock has been obtained due to some failure of the machine, then limit switch LS30 (line 53) remains open. Thus relay CR13 is not energized, and when the drum leaves the vicinity of switch LS31 (line 50) at time T4, relay CR15 is de-energized. Relay contacts CR15a (line 57) and relay contacts CR13b (line 56) are simultaneously both open, de-energizing relay CR14 (line 57) to disable the main drive through mainline contacts CR14c (line 60) and CR14d and cause the operation of the machine to cease. Contacts CR14b (line 59) open taking power off power supplies PW4 and PW5, permitting manual movement of drums.

If switches LS29 (line 51) and LS31 (line 50) are both open simultaneously, this indicates that the space between the drums is too great. At this time relay CR15 and relay CR12 (line 51) are simultaneously de-energized. Relay contacts CR12a (line 56) and relay contacts CR15a (line 57) are both open, de-energizing relay CR14 (line 57) and causing the operation of the machine to cease.

While there has been described what is at present considered to be preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. A drum for supporting tire carcass plies comprising: a cylinder having a pair of bases and having at one base thereof a generally tapered device with a plurality of grooves spaced axially of said cylinder and having at the other base thereof a plurality of fingers pivotally mounted on one of said bases and disposed to couple the drum selectively to a groove on the tapered device of a like drum to substantially prevent axial and rotational relative movement between said drums.

2. A drum for supporting tire carcass plies comprising: a hollow outer cylinder having a pair of bases and having a coaxial hollow inner sleeve with apertures therein; said outer cylinder having at one base thereof a stepped device with a plurality of peripheral grooves spaced axially of said outer cylinder and having at the other base thereof a plurality of fingers pivotally mounted on one of said bases; said fingers having portions extending through said apertures of said inner sleeve for controlling the positioning of said fingers in response to actuation within said inner sleeve, and said fingers being disposed to couple the drum selectively to a groove on the tapered device of a like drum to substantially prevent axial and rotational movement between said drums.

3. A drum in accordance with claim 2 in which said stepped device is a generally frusto-conical device having inboard and outboard walls, in which each of said grooves is disposed between an inboard wall and an outboard wall of smaller diameter than said inboard wall, in which said outboard wall has a plurality of circumferentially spaced slots therein, and in which at least one of said slots has a web extending therealong adapted to engage a slot in a wall of a generally frusto-conical device of a like drum.

4. A drum in accordance with claim 1 having a pair of cylindrical bands slidably mounted at the ends of the drum providing cylindrical, retractable extensions of the drum.

References Cited by the Examiner
UNITED STATES PATENTS

| | | | |
|---|---|---|---|
| 1,869,656 | 8/1932 | Black | 156—415 |
| 2,071,716 | 2/1937 | Wikle | 156—396 |
| 2,319,643 | 5/1943 | Sternad et al. | 156—396 |
| 2,614,951 | 10/1952 | Iredell | 156—419 |
| 2,818,907 | 1/1958 | Sapp | 156—396 |

EARL M. BERGERT, *Primary Examiner.*

HAROLD ANSHER, *Assistant Examiner.*